US012777403B2

(12) United States Patent
Shrivastava et al.

(10) Patent No.: US 12,777,403 B2
(45) Date of Patent: Oct. 27, 2026

(54) UPLINK REPORTS AND STORE AND FORWARD MODE

(71) Applicant: QUALCOMM Incorporated, San Diego, CA (US)

(72) Inventors: Avinash Shrivastava, Hyderabad (IN); Stephen William Edge, Escondido, CA (US)

(73) Assignee: Qualcomm Incorporated, San Diego, CA (US)

( * ) Notice: Subject to any disclaimer, the term of this patent is extended or adjusted under 35 U.S.C. 154(b) by 290 days.

(21) Appl. No.: 18/439,106

(22) Filed: Feb. 12, 2024

(65) Prior Publication Data

US 2025/0261081 A1 Aug. 14, 2025

(51) Int. Cl.

*H04W 40/20* (2009.01)
*H04L 49/25* (2022.01)
*H04W 84/06* (2009.01)

(52) U.S. Cl.

CPC ........... *H04W 40/20* (2013.01); *H04L 49/252* (2013.01); *H04W 84/06* (2013.01)

(58) Field of Classification Search

CPC .... H04W 40/20; H04W 84/06; H04L 49/252; H04L 49/356; H04B 7/204; H04B 7/185

See application file for complete search history.

(56) References Cited

U.S. PATENT DOCUMENTS

2025/0056401 A1* 2/2025 Xu ........................ H04W 64/00
2025/0184828 A1* 6/2025 Ou ........................ H04W 48/02

* cited by examiner

*Primary Examiner* — Mohamed A Kamara

(74) *Attorney, Agent, or Firm* — HOLLAND & HART LLP

(57) ABSTRACT

Some wireless communication systems include one or more user equipments (UEs) and one or more non-terrestrial network (NTN) nodes (e.g., satellites). In some approaches, a UE may collect report data, such as a minimization of drive test report or UE assistance information. When a NTN node operates in a store and forward mode, the NTN node may have intermittent connectivity with a core network. In some examples of the techniques described herein, a UE may store data collected when the NTN node is operating in the store and forward mode. The UE may transmit delayed report data based on the collected data to a core network when the UE has coverage from a terrestrial network node or a NTN node. For example, the UE may transmit UE location data collected when the NTN node is operating in the store and forward mode.

30 Claims, 17 Drawing Sheets

UPLINK REPORTS AND STORE AND FORWARD MODE

FIELD OF TECHNOLOGY

The following relates to wireless communications, including uplink reports and store and forward mode.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations, each supporting wireless communication for communication devices, which may be known as user equipment (UE).

SUMMARY

Some wireless communication systems include one or more user equipments (UEs) and one or more non-terrestrial network (NTN) nodes (e.g., satellites). In some approaches, a UE may collect report data, such as a minimization of drive test (MDT) report or UE assistance information (UAI). When a NTN node operates in a store and forward mode, the NTN node may have intermittent connectivity with a core network.

In some examples of the techniques described herein, a UE may store data collected when the NTN node is operating in the store and forward mode. The UE may transmit delayed report data based on the collected data to a core network when the UE has coverage from a terrestrial network (TN) node or a NTN node. For example, the UE may transmit UE location data collected when the NTN node is operating in the store and forward mode. In some examples, the UE location data may indicate a location history in the form of coordinates (e.g., latitude and longitude, earth-centered earth-fixed (ECEF) coordinates, among other examples) or one or more physical addresses where UE has been located. In some approaches, the UE may transmit coverage information collected when the NTN node is operating in the store and forward mode. The coverage information may indicate the coverage or availability of one or more TN cells, of one or more NTN cells (that are operating in a non-store and forward mode), of one or more NTN cells operating in the store and forward mode, or may indicate a lack of coverage at one or more times or locations, or any combination thereof. In some examples, the coverage information (e.g., a wireless wide area network (WWAN) coverage status information element) may indicate a coverage status with time, which may be useful to enhance mobile network operator (MNO) services. In some approaches, a WWAN coverage map may be generated based on the coverage information. In some examples, the coverage information may indicate details of coverage, availability, or unavailability of one or more public land mobile networks (PLMNs), radio access technologies (RATs), or availability durations.

A method by a UE is described. The method may include receiving an indication that a first NTN node accessible to the UE is operating in a store and forward mode, storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN, and transmitting report data indicating the location data and the coverage information.

A UE is described. The UE may include one or more memories storing processor executable code, and one or more processors coupled with the one or more memories. The one or more processors may individually or collectively be operable to execute the code to cause the UE to receive an indication that a first NTN node accessible to the UE is operating in a store and forward mode, store location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN, and transmit report data indicating the location data and the coverage information.

Another UE is described. The UE may include means for receiving an indication that a first NTN node accessible to the UE is operating in a store and forward mode, means for storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN, and means for transmitting report data indicating the location data and the coverage information.

A non-transitory computer-readable medium storing code is described. The code may include instructions executable by one or more processors to receive an indication that a first NTN node accessible to the UE is operating in a store and forward mode, store location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN, and transmit report data indicating the location data and the coverage information.

In some examples of the method, UEs, and non-transitory computer-readable medium described herein, the report data may be transmitted to at least one of the one or more NTN nodes during the period that the one or more NTN nodes accessible to the UE may be operating in the store and forward mode.

Some examples of the method, UEs, and non-transitory computer-readable medium described herein may further include operations, features, means, or instructions for receiving an indication of a rejection of management for the report data transmitted to the at least one of the one or more NTN nodes during the period and transmitting, based on the indication of the rejection, the report data to a TN node or to an NTN node not operating in the store and forward mode.

Some examples of the method, UEs, and non-transitory computer-readable medium described herein may further include operations, features, means, or instructions for receiving a message from the at least one of the one or more NTN nodes to transmit the report data during the period that the one or more NTN nodes accessible to the UE may be operating in the store and forward mode, where transmitting the report data may be based on the message.

In some examples of the method, UEs, and non-transitory computer-readable medium described herein, transmitting the report data may include operations, features, means, or instructions for transmitting the report data to a terrestrial network node.

Some examples of the method, UEs, and non-transitory computer-readable medium described herein may further include operations, features, means, or instructions for receiving a request for the location data and the coverage information, the request being included in a UE information request message or a logged measurement configuration message, where the location data and the coverage information may be stored at least partially during the period that the one or more NTN nodes accessible to the UE may be operating in the store and forward mode based on receiving the request.

In some examples of the method, UEs, and non-transitory computer-readable medium described herein, the coverage information includes WWAN coverage status information, PLMN availability information, RAT availability information, or any combination thereof.

In some examples of the method, UEs, and non-transitory computer-readable medium described herein, the coverage information includes a first parameter indicating availability of a TN cell, availability of an NTN cell, availability of an NTN cell operating in the store and forward mode, no coverage, or any combination thereof, and a second parameter indicating availability of a PLMN, availability of a RAT, a duration of availability, or any combination thereof.

In some examples of the method, UEs, and non-transitory computer-readable medium described herein, the report data may be included in a radio resource control (RRC) message, UE assistance information (UAI), a minimization of drive test (MDT) report, a message at a layer higher than a physical layer, a non-access stratum (NAS) message, a user plane message, or any combination thereof.

A method by a NTN node is described. The method may include transmitting an indication that the NTN node is operating in a store and forward mode and obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

A NTN node is described. The NTN node may include one or more memories storing processor executable code, and one or more processors coupled with the one or more memories. The one or more processors may individually or collectively be operable to execute the code to cause the NTN node to transmit an indication that the NTN node is operating in a store and forward mode and obtain report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

Another NTN node is described. The NTN node may include means for transmitting an indication that the NTN node is operating in a store and forward mode and means for obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

A non-transitory computer-readable medium storing code is described. The code may include instructions executable by one or more processors to transmit an indication that the NTN node is operating in a store and forward mode and obtain report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

In some examples of the method, NTN nodes, and non-transitory computer-readable medium described herein, the report data may be obtained in the period that that the one or more NTN nodes accessible to the UE may be operating in the store and forward mode.

Some examples of the method, NTN nodes, and non-transitory computer-readable medium described herein may further include operations, features, means, or instructions for transmitting an indication of rejection of management for the report data obtained in the period.

Some examples of the method, NTN nodes, and non-transitory computer-readable medium described herein may further include operations, features, means, or instructions for transmitting the report data to a core network when a feeder link between the NTN node and the core network may be available.

Some examples of the method, NTN nodes, and non-transitory computer-readable medium described herein may further include operations, features, means, or instructions for transmitting a message to transmit the report data during the period that the one or more NTN nodes accessible to the UE may be operating in the store and forward mode, where obtaining the report data may be based on the message.

Some examples of the method, NTN nodes, and non-transitory computer-readable medium described herein may further include operations, features, means, or instructions for transmitting a request for the location data and the coverage information, the request being included in a UE information request message or a logged measurement configuration message, where the location data and the coverage information may be obtained at least partially during the period that the NTN node may be operating in the store and forward mode based on transmitting the request.

In some examples of the method, NTN nodes, and non-transitory computer-readable medium described herein, the coverage information includes WWAN coverage status information, PLMN availability information, RAT availability information, or any combination thereof.

In some examples of the method, NTN nodes, and non-transitory computer-readable medium described herein, the coverage information includes a first parameter indicating availability of a TN cell, availability of an NTN cell, availability of an NTN cell operating in the store and forward mode, no coverage, or any combination thereof, and a second parameter indicating availability of a PLMN, availability of a RAT, a duration of availability, or any combination thereof.

In some examples of the method, NTN nodes, and non-transitory computer-readable medium described herein, the report data may be included in an RRC message, UE assistance information (UAI), a minimization of drive test (MDT) report, a message at a layer higher than a physical layer, a non-access stratum (NAS) message, a user plane message, or any combination thereof.

DETAILED DESCRIPTION

Figure 1:
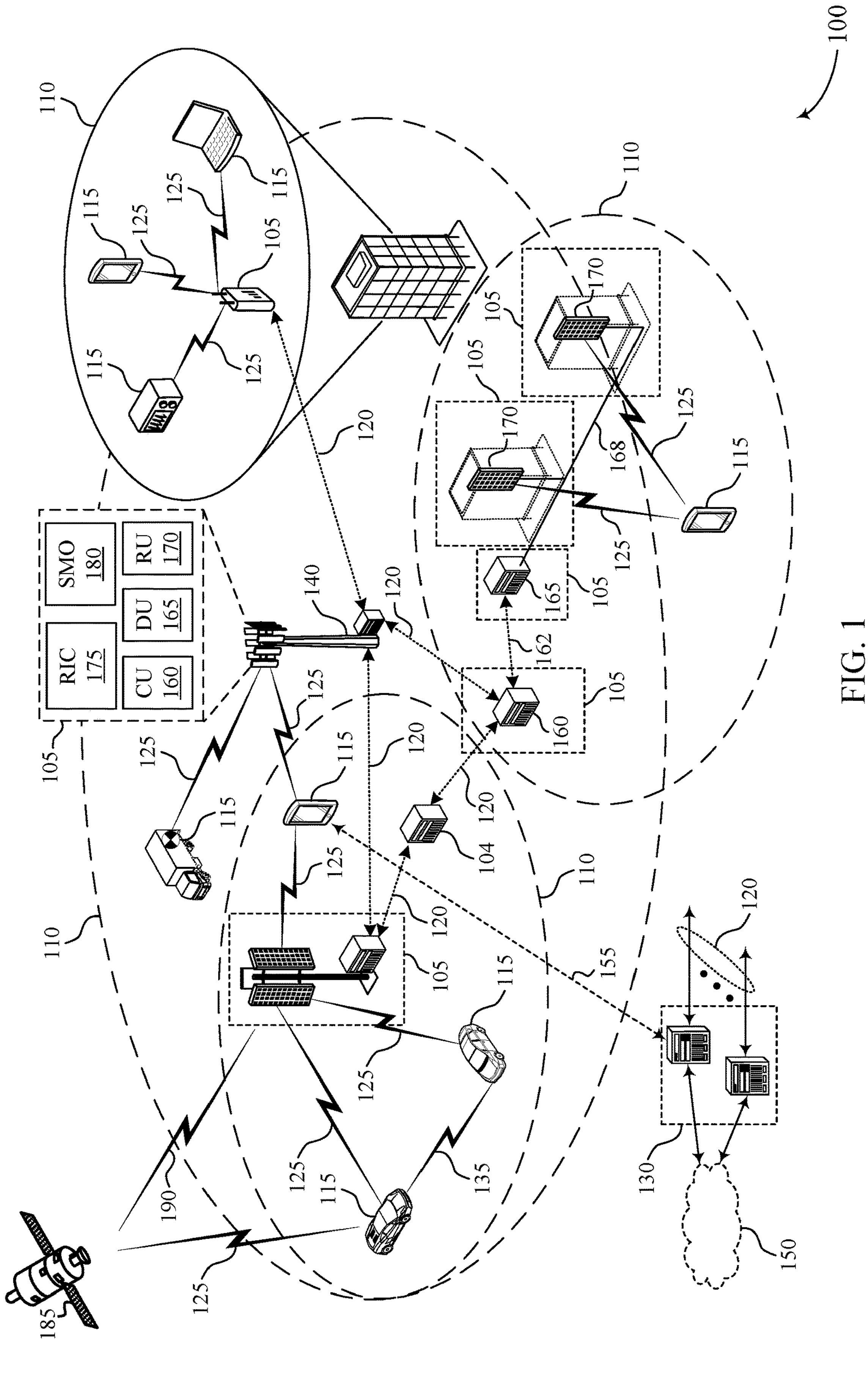
FIG. 1 shows an example of a wireless communications system that supports uplink reports and store and forward mode in accordance with one or more aspects of the present disclosure.

Some wireless communication systems include one or more user equipments (UEs) and one or more non-terrestrial network (NTN) nodes (e.g., satellites). In some approaches, a UE may collect report data, such as a minimization of drive test (MDT) report or UE assistance information (UAI). When a NTN node operates in a store and forward mode, the NTN node may have intermittent connectivity with a core network. In some cases when the NTN node is operating in the store and forward mode, the UE may be unable to send an MDT report or UAI via the NTN node because the information may be outdated for the core network or the information may have reduced utility if a feeder link between the NTN node and the core network is not restored for an extended period of time. These issues may be exacerbated when the UE is moving or roaming, or when handover occurs. Accordingly, some approaches may not function if the UE cannot connect to the NTN (e.g., due to a restriction or loading status of the NTN or discontinuous NTN coverage). Some examples of the techniques described herein may provide approaches where one or more reports (e.g., MDT or UAI reports) may provide enhanced information in one or more scenarios or conditions.

In some examples of the techniques described herein, a UE may store data collected when the NTN node is operating in the store and forward mode. The UE may transmit delayed report data based on the collected data to a core network when the UE has coverage from a terrestrial network (TN) node or a NTN node. For example, the UE may transmit UE location data collected when the NTN node is operating in the store and forward mode. In some examples, the UE location data may indicate a location history in the form of coordinates (e.g., latitude and longitude) or one or more physical addresses where UE has been located.

In some approaches, the UE may transmit coverage information collected when the NTN node is operating in the store and forward mode. The coverage information may indicate the coverage or availability of one or more TN cells, of one or more NTN cells (that are operating in a non-store and forward mode), of one or more NTN cells operating in the store and forward mode, or may indicate a lack of coverage at one or more times or locations, or any combination thereof. In some examples, the coverage information (e.g., a wireless wide area network (WWAN) coverage status information element) may indicate a coverage status with time, which may be useful to enhance mobile network operator (MNO) services. In some approaches, a WWAN coverage map may be generated based on the coverage information. In some examples, the coverage information may indicate details of coverage, availability, or unavailability of one or more public land mobile networks (PLMNs), radio access technologies (RATs), or availability durations.

Some examples of the techniques described herein may enable the collection of information via a satellite connection to enhance NTN or TN planning. Some of the techniques may be utilized to survey an area and collect data regarding usage demands of the users in a remote area, which may help in deploying one or more terrestrial networks in the remote area. For instance, the collected data may be utilized to determine a quantity(ies), location(s), or capability(ies) of one or more TN base stations for deployment. An NTN deployment may be utilized to collect the data (which may represent the usage demands of the users in the remote area), and may provide services to the users in the remote area. Accordingly, data may be collected via the NTN, where the data may be used for determining a TN deployment in the area.

Some approaches may provide one or more enhancements to UE or network operation. A UE may operate in a power-efficient manner to report uplink measurements to a network. Some techniques may address one or more issues related to TN or NTN enhancement (e.g., optimization) or coverage gaps and may be useful for coverage planning. Additionally, or alternatively, a UE may operate efficiently when an NTN node (e.g., satellite) is operating in the store and forward mode. For example, MDT or UAI reports may provide information (e.g., parameters) regarding a UE's surrounding environment (e.g., available service) with time or location information, which may have an enhanced role in network deployment. In some aspects, one or more relatively timely reports may be provided to a core network by delaying an amount of time when store and forward mode is active. In some examples, the reported data may be utilized to enhance one or more networks (e.g., to determine when and how an inter-satellite link (ISL) may be active, or to determine whether more NTN satellites or more NTN gateways may be utilized for feeder links).

Aspects of the disclosure are initially described in the context of wireless communications systems. Aspects of the disclosure are further illustrated by and described with reference to process flows that relate to uplink reports and store and forward mode. Aspects of the disclosure are further illustrated by and described with reference to apparatus diagrams, system diagrams, and flowcharts that relate to uplink reports and store and forward mode.

FIG. 1 shows an example of a wireless communications system 100 that supports uplink reports and store and forward mode in accordance with one or more aspects of the present disclosure. The wireless communications system 100 may include one or more network entities 105, one or more UEs 115, and a core network 130. In some examples, the wireless communications system 100 may be a Long Term Evolution (LTE) network, an LTE-Advanced (LTE-A) network, an LTE-A Pro network, a New Radio (NR) network, or a network operating in accordance with other systems and radio technologies, including future systems and radio technologies not explicitly mentioned herein.

The network entities 105 may be dispersed throughout a geographic area to form the wireless communications system 100 and may include devices in different forms or having different capabilities. In various examples, a network entity 105 may be referred to as a network element, a mobility element, a radio access network (RAN) node, or network equipment, among other nomenclature. In some examples, network entities 105 and UEs 115 may wirelessly communicate via one or more communication links 125 (e.g., a radio frequency (RF) access link). For example, a network entity 105 may support a coverage area 110 (e.g., a geographic coverage area) over which the UEs 115 and the network entity 105 may establish one or more communication links 125. The coverage area 110 may be an example of a geographic area over which a network entity 105 and a UE 115 may support the communication of signals according to one or more RATs.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be capable of supporting communications with various types of devices, such as other UEs 115 or network entities 105, as shown in FIG. 1.

As described herein, a node of the wireless communications system 100, which may be referred to as a network node, or a wireless node, may be a network entity 105 (e.g., any network entity described herein), a UE 115 (e.g., any UE described herein), a network controller, an apparatus, a device, a computing system, one or more components, or another suitable processing entity configured to perform any of the techniques described herein. For example, a node may be a UE 115. As another example, a node may be a network entity 105. As another example, a first node may be configured to communicate with a second node or a third node. In one aspect of this example, the first node may be a UE 115, the second node may be a network entity 105, and the third node may be a UE 115. In another aspect of this example, the first node may be a UE 115, the second node may be a network entity 105, and the third node may be a network entity 105. In yet other aspects of this example, the first, second, and third nodes may be different relative to these examples. Similarly, reference to a UE 115, network entity 105, apparatus, device, computing system, or the like may include disclosure of the UE 115, network entity 105, apparatus, device, computing system, or the like being a node. For example, disclosure that a UE 115 is configured to receive information from a network entity 105 also discloses that a first node is configured to receive information from a second node.

In some examples, network entities 105 may communicate with the core network 130, or with one another, or both. For example, network entities 105 may communicate with the core network 130 via one or more backhaul communication links 120 (e.g., in accordance with an S1, N2, N3, or other interface protocol). In some examples, network entities 105 may communicate with one another via a backhaul communication link 120 (e.g., in accordance with an X2, Xn, or other interface protocol) either directly (e.g., directly between network entities 105) or indirectly (e.g., via a core network 130). In some examples, network entities 105 may communicate with one another via a midhaul communication link 162 (e.g., in accordance with a midhaul interface protocol) or a fronthaul communication link 168 (e.g., in accordance with a fronthaul interface protocol), or any combination thereof. The backhaul communication links 120, midhaul communication links 162, or fronthaul communication links 168 may be or include one or more wired links (e.g., an electrical link, an optical fiber link), one or more wireless links (e.g., a radio link, a wireless optical link), among other examples or various combinations thereof. A UE 115 may communicate with the core network 130 via a communication link 155.

One or more of the network entities 105 described herein may include or may be referred to as a base station 140 (e.g., a base transceiver station, a radio base station, an NR base station, an access point, a radio transceiver, a NodeB, an eNodeB (eNB), a next-generation NodeB or a giga-NodeB (either of which may be referred to as a gNB), a 5G NB, a next-generation eNB (ng-eNB), a Home NodeB, a Home eNodeB, or other suitable terminology). In some examples, a network entity 105 (e.g., a base station 140) may be implemented in an aggregated (e.g., monolithic, standalone) base station architecture, which may be configured to utilize a protocol stack that is physically or logically integrated within a single network entity 105 (e.g., a single RAN node, such as a base station 140).

In some examples, a network entity 105 may be implemented in a disaggregated architecture (e.g., a disaggregated base station architecture, a disaggregated RAN architecture), which may be configured to utilize a protocol stack that is physically or logically distributed among two or more network entities 105, such as an integrated access backhaul (IAB) network, an open RAN (O-RAN) (e.g., a network configuration sponsored by the O-RAN Alliance), or a virtualized RAN (vRAN) (e.g., a cloud RAN (C-RAN)). For example, a network entity 105 may include one or more of a central unit (CU) 160, a distributed unit (DU) 165, a radio unit (RU) 170, a RAN Intelligent Controller (RIC) 175 (e.g., a Near-Real Time RIC (Near-RT RIC), a Non-Real Time RIC (Non-RT RIC)), a Service Management and Orchestration (SMO) 180 system, or any combination thereof. An RU 170 may also be referred to as a radio head, a smart radio head, a remote radio head (RRH), a remote radio unit (RRU), or a transmission reception point (TRP). One or more components of the network entities 105 in a disaggregated RAN architecture may be co-located, or one or more components of the network entities 105 may be located in distributed locations (e.g., separate physical locations). In some examples, one or more network entities 105 of a disaggregated RAN architecture may be implemented as virtual units (e.g., a virtual CU (VCU), a virtual DU (VDU), a virtual RU (VRU)).

The split of functionality between a CU 160, a DU 165, and an RU 170 is flexible and may support different functionalities depending on which functions (e.g., network layer functions, protocol layer functions, baseband functions, RF functions, and any combinations thereof) are performed at a CU 160, a DU 165, or an RU 170. For example, a functional split of a protocol stack may be employed between a CU 160 and a DU 165 such that the CU 160 may support one or more layers of the protocol stack and the DU 165 may support one or more different layers of the protocol stack. In some examples, the CU 160 may host upper protocol layer (e.g., layer 3 (L3), layer 2 (L2)) functionality and signaling (e.g., Radio Resource Control (RRC), service data adaption protocol (SDAP), Packet Data Convergence Protocol (PDCP)). The CU 160 may be connected to one or more DUs 165 or RUs 170, and the one or more DUs 165 or RUs 170 may host lower protocol layers, such as layer 1 (L1) (e.g., physical (PHY) layer) or L2 (e.g., radio link control (RLC) layer, medium access control (MAC) layer) functionality and signaling, and may each be at least partially controlled by the CU 160. Additionally, or alternatively, a functional split of the protocol stack may be employed between a DU 165 and an RU 170 such that the DU 165 may support one or more layers of the protocol stack and the RU 170 may support one or more different layers of the protocol stack. The DU 165 may support one or multiple different cells (e.g., via one or more RUs 170). In some cases, a functional split between a CU 160 and a DU 165, or between a DU 165 and an RU 170 may be within a protocol layer (e.g., some functions for a protocol layer may be performed by one of a CU 160, a DU 165, or an RU 170, while other functions of the protocol layer are performed by a different one of the CU 160, the DU 165, or the RU 170). A CU 160 may be functionally split further into CU control plane (CU-CP) and CU user plane (CU-UP) functions. A CU 160 may be connected to one or more DUs 165 via a midhaul communication link 162 (e.g., F1, F1-c, F1-u), and a DU 165 may be connected to one or more RUs 170 via a fronthaul communication link 168 (e.g., open fronthaul (FH) interface). In some examples, a midhaul communication link 162 or a fronthaul communication link 168 may be implemented in accordance with an interface (e.g., a channel) between layers of a protocol stack supported by respective network entities 105 that are in communication via such communication links.

In wireless communications systems (e.g., wireless communications system 100), infrastructure and spectral resources for radio access may support wireless backhaul link capabilities to supplement wired backhaul connections, providing an IAB network architecture (e.g., to a core network 130). In some cases, in an IAB network, one or more network entities 105 (e.g., IAB nodes 104) may be partially controlled by each other. One or more IAB nodes 104 may be referred to as a donor entity or an IAB donor. One or more DUs 165 or one or more RUs 170 may be partially controlled by one or more CUs 160 associated with a donor network entity 105 (e.g., a donor base station 140). The one or more donor network entities 105 (e.g., IAB donors) may be in communication with one or more additional network entities 105 (e.g., IAB nodes 104) via supported access and backhaul links (e.g., backhaul communication links 120). IAB nodes 104 may include an IAB mobile termination (IAB-MT) controlled (e.g., scheduled) by DUs 165 of a coupled IAB donor. An IAB-MT may include an independent set of antennas for relay of communications with UEs 115, or may share the same antennas (e.g., of an RU 170) of an IAB node 104 used for access via the DU 165 of the IAB node 104 (e.g., referred to as virtual IAB-MT (vIAB-MT)). In some examples, the IAB nodes 104 may include DUs 165 that support communication links with additional entities (e.g., IAB nodes 104, UEs 115) within the relay chain or configuration of the access network (e.g., downstream). In such cases, one or more components of the disaggregated RAN architecture (e.g., one or more IAB nodes 104 or components of IAB nodes 104) may be configured to operate according to the techniques described herein.

For instance, an access network (AN) or RAN may include communications between access nodes (e.g., an IAB donor), IAB nodes 104, and one or more UEs 115. The IAB donor may facilitate connection between the core network 130 and the AN (e.g., via a wired or wireless connection to the core network 130). That is, an IAB donor may refer to a RAN node with a wired or wireless connection to core network 130. The IAB donor may include a CU 160 and at least one DU 165 (e.g., and RU 170), in which case the CU 160 may communicate with the core network 130 via an interface (e.g., a backhaul link). IAB donor and IAB nodes 104 may communicate via an F1 interface according to a protocol that defines signaling messages (e.g., an F1 AP protocol). Additionally, or alternatively, the CU 160 may communicate with the core network via an interface, which may be an example of a portion of backhaul link, and may communicate with other CUs 160 (e.g., a CU 160 associated with an alternative IAB donor) via an Xn-C interface, which may be an example of a portion of a backhaul link.

An IAB node 104 may refer to a RAN node that provides IAB functionality (e.g., access for UEs 115, wireless self-backhauling capabilities). A DU 165 may act as a distributed scheduling node towards child nodes associated with the IAB node 104, and the IAB-MT may act as a scheduled node towards parent nodes associated with the IAB node 104. That is, an IAB donor may be referred to as a parent node in communication with one or more child nodes (e.g., an IAB donor may relay transmissions for UEs through one or more other IAB nodes 104). Additionally, or alternatively, an IAB node 104 may also be referred to as a parent node or a child node to other IAB nodes 104, depending on the relay chain or configuration of the AN. Therefore, the IAB-MT entity of IAB nodes 104 may provide a Uu interface for a child IAB node 104 to receive signaling from a parent IAB node 104, and the DU interface (e.g., DUs 165) may provide a Uu interface for a parent IAB node 104 to signal to a child IAB node 104 or UE 115.

For example, IAB node 104 may be referred to as a parent node that supports communications for a child IAB node, or referred to as a child IAB node associated with an IAB donor, or both. The IAB donor may include a CU 160 with a wired or wireless connection (e.g., a backhaul communication link 120) to the core network 130 and may act as parent node to IAB nodes 104. For example, the DU 165 of IAB donor may relay transmissions to UEs 115 through IAB nodes 104, or may directly signal transmissions to a UE 115, or both. The CU 160 of IAB donor may signal communication link establishment via an F1 interface to IAB nodes 104, and the IAB nodes 104 may schedule transmissions (e.g., transmissions to the UEs 115 relayed from the IAB donor) through the DUs 165. That is, data may be relayed to and from IAB nodes 104 via signaling via an NR Uu interface to MT of the IAB node 104. Communications with IAB node 104 may be scheduled by a DU 165 of IAB donor and communications with IAB node 104 may be scheduled by DU 165 of IAB node 104.

In the case of the techniques described herein applied in the context of a disaggregated RAN architecture, one or more components of the disaggregated RAN architecture may be configured to support uplink reports and store and forward mode as described herein. For example, some operations described as being performed by a UE 115 or a network entity 105 (e.g., a base station 140) may additionally, or alternatively, be performed by one or more components of the disaggregated RAN architecture (e.g., IAB nodes 104, DUs 165, CUs 160, RUs 170, RIC 175, SMO 180).

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the network entities 105 and the network equipment including macro eNBs or gNBs, small cell eNBs or gNBs, or relay base stations, among other examples, as shown in FIG. 1.

The UEs 115 and the network entities 105 may wirelessly communicate with one another via one or more communication links 125 (e.g., an access link) using resources associated with one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers. Communication between a network entity 105 and other devices may refer to communication between the devices and any portion (e.g., entity, sub-entity) of a network entity 105. For example, the terms "transmitting," "receiving," or "communicating," when referring to a network entity 105, may refer to any portion of a network entity 105 (e.g., a base station 140, a CU 160, a DU 165, a RU 170) of a RAN communicating with another device (e.g., directly or via one or more other network entities 105).

In some examples, such as in a carrier aggregation configuration, a carrier may also have acquisition signaling or control signaling that coordinates operations for other carriers. A carrier may be associated with a frequency channel (e.g., an evolved universal mobile telecommunication system terrestrial radio access (E-UTRA) absolute RF channel number (EARFCN)) and may be identified according to a channel raster for discovery by the UEs 115. A carrier may be operated in a standalone mode, in which case initial acquisition and connection may be conducted by the UEs 115 via the carrier, or the carrier may be operated in a non-standalone mode, in which case a connection is anchored using a different carrier (e.g., of the same or a different radio access technology).

The communication links 125 shown in the wireless communications system 100 may include downlink transmissions (e.g., forward link transmissions) from a network entity 105 to a UE 115, uplink transmissions (e.g., return link transmissions) from a UE 115 to a network entity 105, or both, among other configurations of transmissions. Carriers may carry downlink or uplink communications (e.g., in an FDD mode) or may be configured to carry downlink and uplink communications (e.g., in a TDD mode).

A carrier may be associated with a particular bandwidth of the RF spectrum and, in some examples, the carrier bandwidth may be referred to as a "system bandwidth" of the carrier or the wireless communications system 100. For example, the carrier bandwidth may be one of a set of bandwidths for carriers of a particular radio access technology (e.g., 1.4, 3, 5, 10, 15, 20, 40, or 80 megahertz (MHz)). Devices of the wireless communications system 100 (e.g., the network entities 105, the UEs 115, or both) may have hardware configurations that support communications using a particular carrier bandwidth or may be configurable to support communications using one of a set of carrier bandwidths. In some examples, the wireless communications system 100 may include network entities 105 or UEs 115 that support concurrent communications using carriers associated with multiple carrier bandwidths. In some examples, each served UE 115 may be configured for operating using portions (e.g., a sub-band, a BWP) or all of a carrier bandwidth.

Signal waveforms transmitted via a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may refer to resources of one symbol period (e.g., a duration of one modulation symbol) and one subcarrier, in which case the symbol period and subcarrier spacing may be inversely related. The quantity of bits carried by each resource element may depend on the modulation scheme (e.g., the order of the modulation scheme, the coding rate of the modulation scheme, or both), such that a relatively higher quantity of resource elements (e.g., in a transmission duration) and a relatively higher order of a modulation scheme may correspond to a relatively higher rate of communication. A wireless communications resource may refer to a combination of an RF spectrum resource, a time resource, and a spatial resource (e.g., a spatial layer, a beam), and the use of multiple spatial resources may increase the data rate or data integrity for communications with a UE 115.

One or more numerologies for a carrier may be supported, and a numerology may include a subcarrier spacing (Δf) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the network entities 105 or the UEs 115 may be expressed in multiples of a basic time unit which may, for example, refer to a sampling period of $T_s=1/(\Delta f_{max} \cdot N_f)$ seconds, for which $\Delta f_{max}$ may represent a supported subcarrier spacing, and $N_f$ may represent a supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively-numbered subframes or slots, and each subframe or slot may have the same duration. In some examples, a frame may be divided (e.g., in the time domain) into subframes, and each subframe may be further divided into a quantity of slots. Alternatively, each frame may include a variable quantity of slots, and the quantity of slots may depend on subcarrier spacing. Each slot may include a quantity of symbol periods (e.g., depending on the length of the cyclic prefix prepended to each symbol period). In some wireless communications systems 100, a slot may further be divided into multiple mini-slots associated with one or more symbols. Excluding the cyclic prefix, each symbol period may be associated with one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., a quantity of symbol periods in a TTI) may be variable. Additionally, or alternatively, the smallest scheduling unit of the wireless communications system 100 may be dynamically selected (e.g., in bursts of shortened TTIs (STTIs)).

Physical channels may be multiplexed for communication using a carrier according to various techniques. A physical control channel and a physical data channel may be multiplexed for signaling via a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a set of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to an amount of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

A network entity 105 may provide communication coverage via one or more cells, for example a macro cell, a small cell, a hot spot, or other types of cells, or any combination thereof. The term "cell" may refer to a logical communication entity used for communication with a network entity 105 (e.g., using a carrier) and may be associated with an identifier for distinguishing neighboring cells (e.g., a physical cell identifier (PCID), a virtual cell identifier (VCID), or others). In some examples, a cell also may refer to a coverage area 110 or a portion of a coverage area 110 (e.g., a sector) over which the logical communication entity operates. Such cells may range from smaller areas (e.g., a structure, a subset of structure) to larger areas depending on various factors such as the capabilities of the network entity 105. For example, a cell may be or include a building, a subset of a building, or exterior spaces between or overlapping with coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered network entity 105 (e.g., a lower-powered base station 140), as compared with a macro cell, and a small cell may operate using the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A network entity 105 may support one or multiple cells and may also support communications via the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a network entity 105 (e.g., a base station 140, an RU 170) may be movable and therefore provide communication coverage for a moving coverage area 110. In some examples, different coverage areas 110 associated with different technologies may overlap, but the different coverage areas 110 may be supported by the same network entity 105. In some other examples, the overlapping coverage areas 110 associated with different technologies may be supported by different network entities 105. The wireless communications system 100 may include, for example, a heterogeneous network in which different types of the network entities 105 provide coverage for various coverage areas 110 using the same or different radio access technologies.

The wireless communications system 100 may support synchronous or asynchronous operation. For synchronous operation, network entities 105 (e.g., base stations 140) may have similar frame timings, and transmissions from different network entities 105 may be approximately aligned in time. For asynchronous operation, network entities 105 may have different frame timings, and transmissions from different network entities 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a network entity 105 (e.g., a base station 140) without human intervention. In some examples, M2M communication or MTC may include communications from devices that integrate sensors or meters to measure or capture information and relay such information to a central server or application program that uses the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception concurrently). In some examples, half-duplex communications may be performed at a reduced peak rate. Other power conservation techniques for the UEs 115 include entering a power saving deep sleep mode when not engaging in active communications, operating using a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may be configured to support communicating directly with other UEs 115 via a device-to-device (D2D) communication link 135 (e.g., in accordance with a peer-to-peer (P2P), D2D, or sidelink protocol). In some examples, one or more UEs 115 of a group that are performing D2D communications may be within the coverage area 110 of a network entity 105 (e.g., a base station 140, an RU 170), which may support aspects of such D2D communications being configured by (e.g., scheduled by) the network entity 105. In some examples, one or more UEs 115 of such a group may be outside the coverage area 110 of a network entity 105 or may be otherwise unable to or not configured to receive transmissions from a network entity 105. In some examples, groups of the UEs 115 communicating via D2D communications may support a one-to-many (1:M) system in which each UE 115 transmits to each of the other UEs 115 in the group. In some examples, a network entity 105 may facilitate the scheduling of resources for D2D communications. In some other examples, D2D communications may be carried out between the UEs 115 without an involvement of a network entity 105.

In some systems, a D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., network entities 105, base stations 140, RUs 170) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the network entities 105 (e.g., base stations 140) associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

The wireless communications system 100 may operate using one or more frequency bands, which may be in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. UHF waves may be blocked or redirected by buildings and environmental features, which may be referred to as clusters, but the waves may penetrate structures sufficiently for a macro cell to provide service to the UEs 115 located indoors. Communications using UHF waves may be associated with smaller antennas and shorter ranges (e.g., less than 100 kilometers) compared to communications using the smaller frequencies and longer waves of the high frequency (HF) or very high frequency (VHF) portion of the spectrum below 300 MHz.

The wireless communications system 100 may also operate using a super high frequency (SHF) region, which may be in the range of 3 GHz to 30 GHz, also known as the centimeter band, or using an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the network entities 105 (e.g., base stations 140, RUs 170), and EHF antennas of the respective devices may be smaller and more closely spaced than UHF antennas. In some examples, such techniques may facilitate using antenna arrays within a device. The propagation of EHF transmissions, however, may be subject to even greater attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, or NR technology using an unlicensed band such as the 5 GHz industrial, scientific, and medical (ISM) band. While operating using unlicensed RF spectrum bands, devices such as the network entities 105 and the UEs 115 may employ carrier sensing for collision detection and avoidance. In some examples, operations using unlicensed bands may be based on a carrier aggregation configuration in conjunction with component carriers operating using a licensed band (e.g., LAA). Operations using unlicensed spectrum may include downlink transmissions, uplink transmissions, P2P transmissions, or D2D transmissions, among other examples.

A network entity 105 (e.g., a base station 140, an RU 170) or a UE 115 may be equipped with multiple antennas, which may be used to employ techniques such as transmit diversity, receive diversity, multiple-input multiple-output (MIMO) communications, or beamforming. The antennas of a network entity 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a network entity 105 may be located at diverse geographic locations. A network entity 105 may include an antenna array with a set of rows and columns of antenna ports that the network entity 105 may use to support beamforming of communications with a UE 115. Likewise, a UE 115 may include one or more antenna arrays that may support various MIMO or beamforming operations. Additionally, or alternatively, an antenna panel may support RF beamforming for a signal transmitted via an antenna port.

The network entities 105 or the UEs 115 may use MIMO communications to exploit multipath signal propagation and increase spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry information associated with the same data stream (e.g., the same codeword) or different data streams (e.g., different codewords). Different spatial layers may be associated with different antenna ports used for channel measurement and reporting. MIMO techniques include single-user MIMO (SU-MIMO), for which multiple spatial layers are transmitted to the same receiving device, and multiple-user MIMO (MU-MIMO), for which multiple spatial layers are transmitted to multiple devices.

Beamforming, which may also be referred to as spatial filtering, directional transmission, or directional reception, is a signal processing technique that may be used at a transmitting device or a receiving device (e.g., a network entity 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating along particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A network entity 105 or a UE 115 may use beam sweeping techniques as part of beamforming operations. For example, a network entity 105 (e.g., a base station 140, an RU 170) may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a network entity 105 multiple times along different directions. For example, the network entity 105 may transmit a signal according to different beamforming weight sets associated with different directions of transmission. Transmissions along different beam directions may be used to identify (e.g., by a transmitting device, such as a network entity 105, or by a receiving device, such as a UE 115) a beam direction for later transmission or reception by the network entity 105.

Some signals, such as data signals associated with a particular receiving device, may be transmitted by transmitting device (e.g., a transmitting network entity 105, a transmitting UE 115) along a single beam direction (e.g., a direction associated with the receiving device, such as a receiving network entity 105 or a receiving UE 115). In some examples, the beam direction associated with transmissions along a single beam direction may be determined based on a signal that was transmitted along one or more beam directions. For example, a UE 115 may receive one or more of the signals transmitted by the network entity 105 along different directions and may report to the network entity 105 an indication of the signal that the UE 115 received with a highest signal quality or an otherwise acceptable signal quality.

In some examples, transmissions by a device (e.g., by a network entity 105 or a UE 115) may be performed using multiple beam directions, and the device may use a combination of digital precoding or beamforming to generate a combined beam for transmission (e.g., from a network entity 105 to a UE 115). The UE 115 may report feedback that indicates precoding weights for one or more beam directions, and the feedback may correspond to a configured set of beams across a system bandwidth or one or more subbands. The network entity 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted along one or more directions by a network entity 105 (e.g., a base station 140, an RU 170), a UE 115 may employ similar techniques for transmitting signals multiple times along different directions (e.g., for identifying a beam direction for subsequent transmission or reception by the UE 115) or for transmitting a signal along a single direction (e.g., for transmitting data to a receiving device).

A receiving device (e.g., a UE 115) may perform reception operations in accordance with multiple receive configurations (e.g., directional listening) when receiving various signals from a transmitting device (e.g., a network entity 105), such as synchronization signals, reference signals, beam selection signals, or other control signals. For example, a receiving device may perform reception in accordance with multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as “listening” according to different receive configurations or receive directions. In some examples, a receiving device may use a single receive configuration to receive along a single beam direction (e.g., when receiving a data signal). The single receive configuration may be aligned along a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or PDCP layer may be IP-based. An RLC layer may perform packet segmentation and reassembly to communicate via logical channels. A MAC layer may perform priority handling and multiplexing of logical channels into transport channels. The MAC layer also may implement error detection techniques, error correction techniques, or both to support retransmissions to improve link efficiency. In the control plane, an RRC layer may provide establishment, configuration, and maintenance of an RRC connection between a UE 115 and a network entity 105 or a core network 130 supporting radio bearers for user plane data. A PHY layer may map transport channels to physical channels.

The UEs 115 and the network entities 105 may support retransmissions of data to increase the likelihood that data is received successfully. Hybrid automatic repeat request (HARQ) feedback is one technique for increasing the likelihood that data is received correctly via a communication link (e.g., a communication link 125, a D2D communication link 135). HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, in which case the device may provide HARQ feedback in a specific slot for data received via a previous symbol in the slot. In some other examples, the device may provide HARQ feedback in a subsequent slot, or according to some other time interval.

An example of a NTN node 185 (e.g., a satellite) is also illustrated in FIG. 1. In some approaches, the NTN node 185 may be an example of a network entity 105, a RU 170, a DU 165, or a CU 160. The NTN node 185 may implement one or more of the functions described with reference to a network entity 105, RU 170, DU 165, CU 160, or other network node. The NTN node 185 may communicate with one or more UEs 115 via a communication link 125. In some examples, the NTN node 185 may communicate with a network entity 105 via a second communication link 190. For instance, the NTN node 185 may relay a signal or data between a UE 115 and a network entity 105. In some examples, one or more signals or data may be communicated (e.g., relayed) between multiple NTN nodes (e.g., via one or more ISLs). Some examples of the techniques described herein may be utilized in the context of store and forward mode for mobile originated (MO) communication, mobile terminated (MT) communication, inter-satellite communication, data transfer for IoT devices in remote areas, or emergency reports.

In some approaches, a UE 115 may collect report data, such as a MDT report or UAI. When a NTN node 185 operates in a store and forward mode, the NTN node 185 may have intermittent connectivity with a core network (via a network entity 105, for example). Some examples of the techniques described herein may provide approaches where one or more reports (e.g., MDT or UAI reports) may provide enhanced information in one or more scenarios or conditions.

In some examples of the techniques described herein, a UE 115 may store data collected when the NTN node 185 is operating in the store and forward mode. The UE 115 may transmit delayed report data based on the collected data to a core network when the UE 115 has coverage from a TN node (e.g., a network entity 105 of a TN) or a NTN node 185. For example, a UE 115 may transmit UE location data collected when the NTN node 185 is operating in the store and forward mode. In some examples, the UE location data may indicate a location history in the form of coordinates (e.g., latitude and longitude) or one or more physical addresses where UE 115 has been located.

In some approaches, a UE 115 may transmit coverage information collected when the NTN node 185 is operating in the store and forward mode. The coverage information may indicate the coverage or availability of one or more TN cells, of one or more NTN cells (that are operating in a non-store and forward mode), of one or more NTN cells operating in the store and forward mode, or may indicate a lack of coverage at one or more times or locations, or any combination thereof. In some examples, the coverage information (e.g., a WWAN coverage status information element) may indicate a coverage status with time, which may be useful to enhance MNO services. In some approaches, a WWAN coverage map may be generated based on the coverage information. In some examples, the coverage information may indicate details of coverage, availability, or unavailability of one or more PLMNs, RATs, or availability durations.

In some cases, a UE 115 may send one or more reports (e.g., delayed uplink measurement reports) to a PLMN when the UE 115 is in TN or NTN coverage (e.g., when a link to a core network is available). For example, the UE 115 may send the one or more reports when a feeder link between the NTN node 185 and a network entity 105 is available or restored. The one or more reports may include one or more parameters (e.g., one or more parameters in one or more information elements (IEs)) that indicate the UE location data or the coverage information. For example, a UE 115 may send one or more parameters to the network via a RRC message (e.g., in a UAI or in an MDT report), via an upper layer message (e.g., a NAS message, a message at a layer higher than a physical layer), or via a user plane (e.g., to a server that collects information).

Examples of parameters (e.g., IEs) that may be sent may include a location history parameter, a WWAN coverage parameter, or a PLMN parameter or RAT parameter. The location history parameter (e.g., Location_History_Info_r19) may indicate one or more locations of the UE (while the NTN node 185 was in store and forward mode, for instance). For example, the location history parameter may be an IE that indicates the location history of the UE 115 (e.g., one or more locations that the UE has visited). The location history parameter may indicate coordinates (e.g., latitude and longitude coordinates), global navigation satellite system (GNSS) data (e.g., latitude and longitude, global positioning system (GPS) data, globalnaya navigazionnaya sputnikovaya sistema (GLONASS) data, among other examples), an address (e.g., street address, zip code, landmark data, among other examples), other data indicating location, or any combination thereof.

The WWAN coverage parameter (e.g., WWAN_Coverage_Status_r19) may indicate the coverage, availability, or unavailability of one or more TN cells, one or more NTN cells (operating in a "normal mode" or non-store and forward mode, for example), one or more NTN cells in store and forward mode, or no coverage (while the NTN node 185 was in store and forward mode, for instance). The WWAN coverage parameter may indicate or may be associated with one or more locations or times at which the one or more cell(s) are available. In some examples, the WWAN coverage parameter may be an IE that is helpful to capture WWAN coverage status with time. The WWAN coverage parameter may be utilized to improve MNO services. The WWAN coverage parameter may be utilized to create a WWAN coverage map in some approaches.

A PLMN parameter or RAT parameter (e.g., PLMN_RAT_Info_r19) may indicate coverage, availability, or unavailability of one or more PLMNs or RATs (e.g., cellular PLMN(s) or RAT(s), such as 3G, 4G, or 5G network availability). For example, the PLMN parameter or RAT parameter may indicate the availability of one or more PLMNs or RATs while the NTN node 185 was in store and forward mode, for instance. In some examples, the PLMN parameter or RAT parameter may indicate one or more durations associated with the one or more PLMNs or RATs.

In some approaches, the one or more parameters may be sent via a report (e.g., an uplink NTN MDT report or UAI report). For instance, one or more of the parameters (e.g., IEs) may be included in a report when the UE 115 has a core network link (e.g., when the UE is back in normal TN or NTN coverage) when a feeder link via an NTN node 185 is available or restored. In some aspects, sending the report when the UE 115 has a core network link (e.g., when a feeder link is available) may be performed by default. In some examples, the network may not send a request for the information (e.g., report(s), location data, coverage information, or parameter(s)). For instance, no specific request for the information may be sent or received from the network side, and the UE 115 may report the collected information when the UE has an available uplink resource for the report.

In some approaches, the network (e.g., NTN node 185 or network entity 105) may request the information (e.g., one or more IEs) by configuring an IE (e.g., NTN_Satellite_Mode_r19: Normal (Default)/Store and Forward) in a UE information request message or in a logged measurement for NTN information. An example of the NTN_Satellite_Mode_r19 is given with reference to Listing (2). The UE 115 may accordingly collect, update, or include the parameter(s) (e.g., Location_History_Info_r19, WWAN_Coverage_Status_r19, or PLMN_RAT_Info_r19 IE information) in an uplink transmission in the report(s) (e.g., MDT report or UAI as provided with reference to Listing (1)). In some examples, if the IE indicates store and forward (e.g., NTN_Satellite_Mode_r19: Store and Forward) in the UE information request message or logged measurement, the UE may provide information (e.g., one or more reports) with one or more of the location history parameter, WWAN coverage parameter, PLMN parameter, or RAT parameter (e.g., Location_History_Info_r19, WWAN_Coverage_Status_r19, or PLMN_RAT_Info_r19). In some examples, if the IE indicates normal or default (e.g., NTN_Satellite_Mode_r19: Normal) in the UE information request or logged measurement, the UE may not send one or more of the location history parameter, WWAN coverage parameter, PLMN parameter, or RAT parameter (e.g., Location_History_Info_r19, WWAN_Coverage_Status_r19, or PLMN_RAT_Info_r19).

Figure 2:
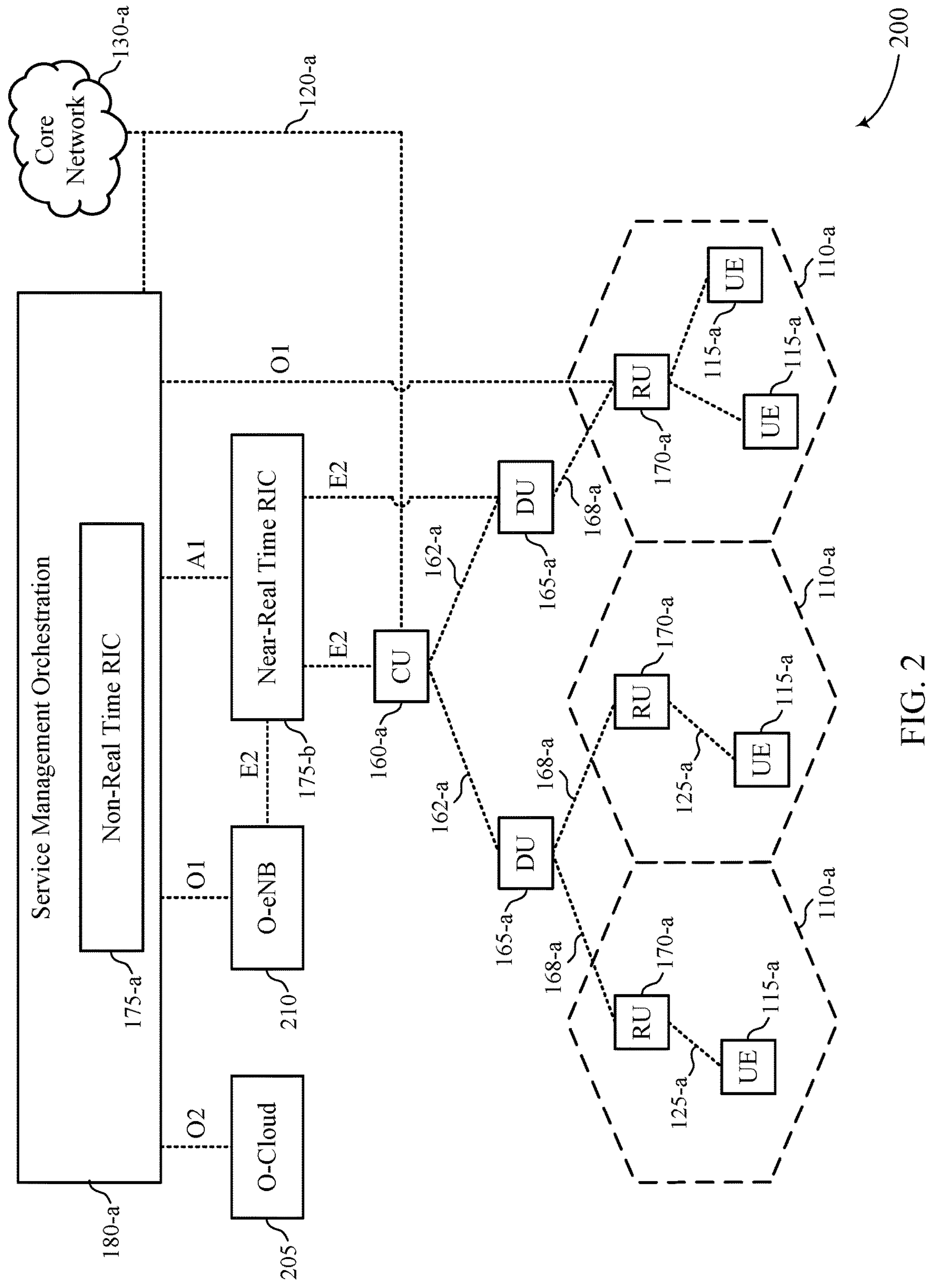
FIG. 2 shows an example of a network architecture that supports uplink reports and store and forward mode in accordance with one or more aspects of the present disclosure.

FIG. 2 shows an example of a network architecture 200 (e.g., a disaggregated base station architecture, a disaggregated RAN architecture) that supports uplink reports and store and forward mode in accordance with one or more aspects of the present disclosure. The network architecture 200 may illustrate an example for implementing one or more aspects of the wireless communications system 100. The network architecture 200 may include one or more CUs 160-*a* that may communicate directly with a core network 130-*a* via a backhaul communication link 120-*a*, or indirectly with the core network 130-*a* through one or more disaggregated network entities 105 (e.g., a Near-RT RIC 175-*b* via an E2 link, or a Non-RT RIC 175-*a* associated with an SMO 180-*a* (e.g., an SMO Framework), or both). A CU 160-*a* may communicate with one or more DUs 165-*a* via respective midhaul communication links 162-*a* (e.g., an F1 interface). The DUs 165-*a* may communicate with one or more RUs 170-*a* via respective fronthaul communication links 168-*a*. The RUs 170-*a* may be associated with respective coverage areas 110-*a* and may communicate with UEs 115-*a* via one or more communication links 125-*a*. In some implementations, a UE 115-*a* may be simultaneously served by multiple RUs 170-*a*.

Each of the network entities 105 of the network architecture 200 (e.g., CUs 160-*a*, DUs 165-*a*, RUs 170-*a*, Non-RT RICs 175-*a*, Near-RT RICs 175-*b*, SMOs 180-*a*, Open Clouds (O-Clouds) 205, Open eNBs (O-eNBs) 210) may include one or more interfaces or may be coupled with one or more interfaces configured to receive or transmit signals (e.g., data, information) via a wired or wireless transmission medium. Each network entity 105, or an associated processor (e.g., controller) providing instructions to an interface of the network entity 105, may be configured to communicate with one or more of the other network entities 105 via the transmission medium. For example, the network entities 105 may include a wired interface configured to receive or transmit signals over a wired transmission medium to one or more of the other network entities 105. Additionally, or alternatively, the network entities 105 may include a wireless interface, which may include a receiver, a transmitter, or transceiver (e.g., an RF transceiver) configured to receive or transmit signals, or both, over a wireless transmission medium to one or more of the other network entities 105.

In some examples, a CU 160-*a* may host one or more higher layer control functions. Such control functions may include RRC, PDCP, SDAP, or the like. Each control function may be implemented with an interface configured to communicate signals with other control functions hosted by the CU 160-*a*. A CU 160-*a* may be configured to handle user plane functionality (e.g., CU-UP), control plane functionality (e.g., CU-CP), or a combination thereof. In some examples, a CU 160-*a* may be logically split into one or more CU-UP units and one or more CU-CP units. A CU-UP unit may communicate bidirectionally with the CU-CP unit via an interface, such as an E1 interface when implemented in an O-RAN configuration. A CU 160-*a* may be implemented to communicate with a DU 165-*a*, as necessary, for network control and signaling.

A DU 165-*a* may correspond to a logical unit that includes one or more functions (e.g., base station functions, RAN functions) to control the operation of one or more RUs 170-*a*. In some examples, a DU 165-*a* may host, at least partially, one or more of an RLC layer, a MAC layer, and one or more aspects of a PHY layer (e.g., a high PHY layer, such as modules for FEC encoding and decoding, scrambling, modulation and demodulation, or the like) depending, at least in part, on a functional split, such as those defined by the 3rd Generation Partnership Project (3GPP). In some examples, a DU 165-*a* may further host one or more low PHY layers. Each layer may be implemented with an interface configured to communicate signals with other layers hosted by the DU 165-*a*, or with control functions hosted by a CU 160-*a*.

In some examples, lower-layer functionality may be implemented by one or more RUs 170-*a*. For example, an RU 170-*a*, controlled by a DU 165-*a*, may correspond to a logical node that hosts RF processing functions, or low-PHY layer functions (e.g., performing fast Fourier transform (FFT), inverse FFT (IFFT), digital beamforming, physical random access channel (PRACH) extraction and filtering, or the like), or both, based at least in part on the functional split, such as a lower-layer functional split. In such an architecture, an RU 170-*a* may be implemented to handle over the air (OTA) communication with one or more UEs 115-*a*. In some implementations, real-time and non-real-time aspects of control and user plane communication with the RU(s) 170-*a* may be controlled by the corresponding DU 165-*a*. In some examples, such a configuration may enable a DU 165-*a* and a CU 160-*a* to be implemented in a cloud-based RAN architecture, such as a vRAN architecture.

The SMO 180-*a* may be configured to support RAN deployment and provisioning of non-virtualized and virtualized network entities 105. For non-virtualized network entities 105, the SMO 180-*a* may be configured to support the deployment of dedicated physical resources for RAN coverage requirements which may be managed via an operations and maintenance interface (e.g., an O1 interface). For virtualized network entities 105, the SMO 180-*a* may be configured to interact with a cloud computing platform (e.g., an O-Cloud 205) to perform network entity life cycle management (e.g., to instantiate virtualized network entities 105) via a cloud computing platform interface (e.g., an O2 interface). Such virtualized network entities 105 can include, but are not limited to, CUs 160-*a*, DUs 165-*a*, RUs 170-*a*, and Near-RT RICs 175-*b*. In some implementations, the SMO 180-*a* may communicate with components configured in accordance with a 4G RAN (e.g., via an O1 interface). Additionally, or alternatively, in some implementations, the SMO 180-*a* may communicate directly with one or more RUs 170-*a* via an O1 interface. The SMO 180-*a* also may include a Non-RT RIC 175-*a* configured to support functionality of the SMO 180-*a*.

The Non-RT RIC 175-*a* may be configured to include a logical function that enables non-real-time control and optimization of RAN elements and resources, Artificial Intelligence (AI) or Machine Learning (ML) workflows including model training and updates, or policy-based guidance of applications/features in the Near-RT RIC 175-*b*. The Non-RT RIC 175-*a* may be coupled to or communicate with (e.g., via an A1 interface) the Near-RT RIC 175-*b*. The Near-RT RIC 175-*b* may be configured to include a logical function that enables near-real-time control and optimization of RAN elements and resources via data collection and actions over an interface (e.g., via an E2 interface) connecting one or more CUs 160-*a*, one or more DUs 165-*a*, or both, as well as an O-eNB 210, with the Near-RT RIC 175-*b*.

In some examples, to generate AI/ML models to be deployed in the Near-RT RIC 175-*b*, the Non-RT RIC 175-*a* may receive parameters or external enrichment information from external servers. Such information may be utilized by the Near-RT RIC 175-*b* and may be received at the SMO 180-*a* or the Non-RT RIC 175-*a* from non-network data sources or from network functions. In some examples, the Non-RT RIC 175-*a* or the Near-RT RIC 175-*b* may be configured to tune RAN behavior or performance. For example, the Non-RT RIC 175-*a* may monitor long-term trends and patterns for performance and employ AI or ML models to perform corrective actions through the SMO 180-*a* (e.g., reconfiguration via O1) or via generation of RAN management policies (e.g., A1 policies).

Figure 3:
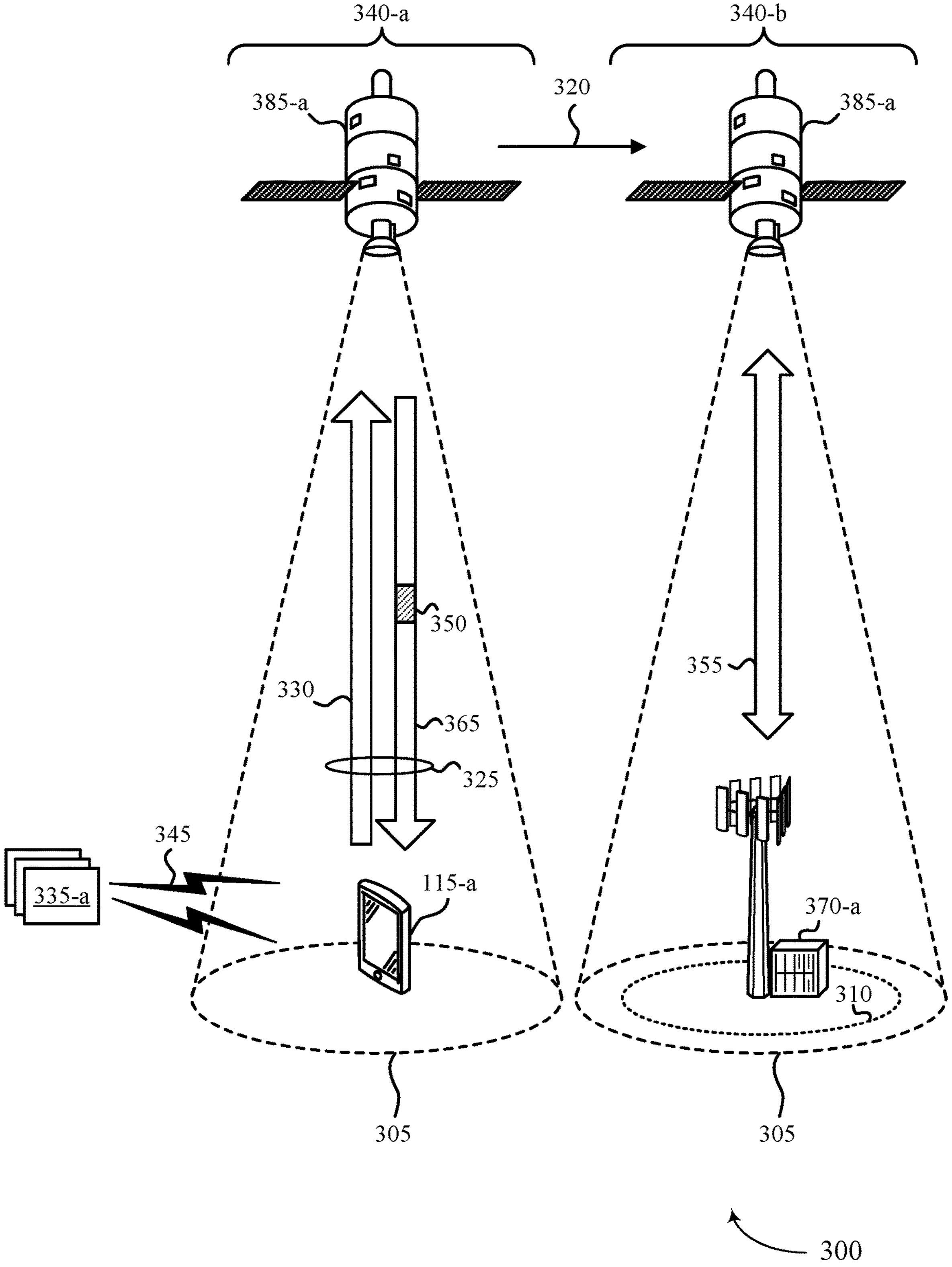
FIG. 3 shows an example of a wireless communications system that supports uplink reports and store and forward mode in accordance with one or more aspects of the present disclosure.

FIG. 3 shows an example of a wireless communications system 300 that supports uplink reports and store and forward mode in accordance with one or more aspects of the present disclosure. In some examples, the wireless communications system 300 may implement aspects of the wireless communication system 100 or the network architecture 200. The wireless communications system 300 may include a UE 115-*a*, a NTN node 385-*a*, a TN node 370-*a*, and one or more nodes 335-*a*. With reference to FIG. 1, the UE 115-*a* may be an example of the UE 115, the NTN node 385-*a* may be an example of the NTN node 185, the TN node 370-*a* may be a network entity 105, or a combination thereof. The one or more nodes 335-*a* may be one or more nodes of a TN (not shown in FIG. 3), one or more nodes of a NTN (not shown in FIG. 3), one or more devices of a PLMN or a RAT, or any combination thereof. In some cases, the NTN node 385-*a* may be one of the one or more nodes 335-*a* or the TN node 370-*a* may be one of the one or more nodes 335-*a*.

In some examples, the NTN node 385-*a* may be a satellite, high altitude platform station (HAPS), high altitude vehicle (HAV), balloon, etc. For instance, the NTN node 385-*a* may be in an orbit, such as low earth orbit, medium earth orbit, geostationary earth orbit, or other non-geostationary earth orbit. The NTN node 385-*a* may be positioned at some distance from Earth (e.g., hundreds or thousands of kilometers from Earth), which may vary or remain relatively fixed. The NTN node 385-*a* may include communication circuitry (e.g., one or more processors, memories, modems, baseband circuitries, among other examples), one or more antennas, or one or more transponders to facilitate reception and transmission of RF signals. The NTN node 385-*a* may serve a coverage area 305 in cases of a NTN.

The TN node 370-*a* may be positioned on the Earth's surface or relatively near to the Earth's surface (e.g., within a mile of the Earth's surface). In some examples, the TN node 370-*a* may be anchored or attached to the Earth's surface. The TN node 370-*a* may include communication circuitry (e.g., one or more processors, memories, modems, baseband circuitries, among other examples) or one or more antennas to facilitate reception and transmission of RF signals. The TN node 370-*a* may provide communication service within a cell area 310. In some examples, the cell area 310 may be included within the coverage area 305, may partially overlap with the coverage area 305, or may be located outside of the coverage area 305. In some examples, network entity 105 (e.g., gNB of a RAN) functionality may be split between the NTN node 385-*a* (e.g., a satellite, an RU on a satellite, or a gNB DU of the RAN, among other examples) and the TN node 370-*a* (e.g., a DU located on the ground or gNB CU of the RAN, among other examples). For instance, the NTN node 385-*a* may be a DU 165 (e.g., may implement DU 165 functionality) and the TN node 370-*a* may be a CU (e.g., may implement CU 160 functionality). In some examples, the NTN node 385-*a* and the TN node 370-*a* are next generation radio access network (NG-RAN) nodes. In some examples, a CU 160 and a DU 165 may reside on the ground and may be associated with one or more terrestrial and non-terrestrial cells or RUs. In a NTN, one or more DUs 165 may be located on a satellite and a CU 160 may be located on the Earth's surface.

In some examples, the TN node 370-*a* may be linked to (e.g., may communicate with) a core network or may be included in the core network. For instance, the TN node 370-*a* may communicate with the core network (e.g., 5G core network) via a NG interface.

The one or more nodes 335-*a* may transmit one or more signals 345. The one or more signals 345 may be detectable (e.g., detected) by the UE 115-*a*. For instance, the UE 115-*a* may detect that the one or more nodes 335-*a* provide coverage (e.g., are available for communication with the UE 115-*a*). In some examples, the UE 115-*a* may ascertain one or more measurements based on the one or more signals 345. For instance, the UE 115-*a* may determine one or more signal measurements (e.g., signal strength measurement(s), received signal strength indicator (RSSI), signal-to-noise ratio (SNR), among other examples) based on the one or more signals 345. In some aspects, the one or more signals 345 may include a broadcast signal, synchronization signal, beacon, or other signal.

The NTN node 385-*a* may operate in a store and forward mode. In the store and forward mode, the NTN node 385-*a* may not have access to (e.g., communication with) a core network or may have intermittent access to (e.g., communication with) the core network. For instance, when the NTN node 385-*a* is in a first position 340-*a*, the NTN node 385-*a* may communicate with the UE 115-*a*, but may not communicate with the TN node 370-*a* due to lack of a second communication link 355 (e.g., feeder link) between the NTN node 385-*a* and the TN node 370-*a*. When the NTN node 385-*a* is in the first position 340-*a*, the UE 115-*a* may communicate with the NTN node 385-*a* using a first communication link 325. The first communication link 325 between the UE 115-*a* and the NTN node 385-*a* may be an example of the communication links 125 described with respect to FIG. 1.

The NTN node 385-*a* may move 320 or change position relative to the TN node 370-*a*. For instance, the NTN node 385-*a* may move 320 due to an orbit of the NTN node 385-*a* or due to movement of the Earth. The coverage area 305 may also move accordingly. When the NTN node 385-*a* is in a second position 340-*b*, the NTN node 385-*a* may communicate with the TN node 370-*a* via a second communication link 355 (and may not communicate with the UE 115-*a*). In some examples, the NTN node 385-*a* may store information corresponding to signals received when the link to the core network is unavailable, and may send (e.g., forward) the information when the link to the core network is available. When the NTN node 385-*a* is in the second position 340-*b*, the NTN node 385-*a* may communicate with the TN node 370-*a* using a second communication link 355. The second communication link 355 between the NTN node 385-*a* and the TN node 370-*a* may be an example of the second communication link 190 described with reference to FIG. 1.

The first communication link 325 and the second communication link 355 may include bi-directional links that enable uplink or downlink communications. For example, the UE 115-*a* may transmit one or more signals on an uplink 330 (e.g., uplink channel(s), uplink resource(s)), such as uplink control signals or uplink data signals, to the NTN node 385-*a* using the first communication link 325. The NTN node 385-*a* may transmit one or more downlink signals on a downlink 365 (e.g., downlink channel(s), downlink resource(s)), such as downlink control signals or downlink data signals, to the UE 115-*a* using the first communication link 325. The NTN node 385-*a* and the TN node 370-*a* may communicate one or more uplink signals on an uplink (e.g., uplink channel(s), uplink resource(s)) of the second communication link 355 or one or more downlink signals on a downlink (e.g., downlink channel(s), downlink resource(s)) of the second communication link 355.

The NTN node 385-*a* may output (e.g., transmit) an indication 350 that the NTN node 385-*a* is operating in the store and forward mode. For instance, the NTN node 385-*a* may transmit one or more signals, messages, or parameters indicating that the NTN node 385-*a* is operating in the store and forward mode. The UE 115-*a* may receive the indication 350 that the NTN node 385-*a* accessible to the UE 115-*a* is operating in the store and forward mode. While one NTN node 385-*a* is shown in FIG. 1, one or more NTN nodes may be accessible to the UE 115-*a* or may operate in the store and forward mode. Additionally, or alternatively, the UE 115-*a* may receive the indication 350 from another entity (e.g., from the TN node 370-*a* or one or more nodes 335-*a*).

The UE 115-*a* may collect or determine location data at least partially during a period that the NTN node 385-*a* is operating in the store and forward mode. For example, the UE 115-*a* may determine location data of the UE 115-*a* indicating one or more locations of the UE 115-*a*. The location data may include coordinates (e.g., latitude and longitude coordinates), GNSS data (e.g., latitude and longitude, GPS data, GLONASS data, among other examples), an address (e.g., street address, zip code, landmark data, among other examples), other data indicating location, or any combination thereof. For instance, the UE 115-*a* may determine the location data using GPS trilateration, Wi-Fi positioning, signal strength measurements from established beacons, or any combination thereof.

The UE 115-*a* may collect or determine coverage information at least partially during the period that the NTN node 385-*a* is operating in the store and forward mode. As described herein, the coverage information may indicate the coverage or availability of one or more TN cells, of one or more NTN cells (that are operating in a "normal" or non-store and forward mode), of one or more NTN cells operating in the store and forward mode, or may indicate a lack of coverage at one or more times or locations, or any combination thereof. Additionally, or alternatively, the coverage information may indicate details of coverage, availability, or unavailability of one or more PLMNs, RATs, or availability durations. In some examples, the UE 115-*a* may collect or determine the coverage information based on the one or more signals 345 from the one or more nodes 335-*a*. For instance, the UE 115-*a* may collect or determine the coverage information based on the one or more signals 345 as one or more signal strength measurements, one or more identifiers indicated by the one or more signals 345 (e.g., identifier(s) indicating one or more cell identities, node identifiers, or node addresses, among other examples), or one or more accessibility indicators (e.g., whether the UE 115-*a* is permitted to access the node(s) 335-*a*, carrier identifier(s), whether the node(s) 335-*a* are publicly accessible, among other examples). In some aspects, the coverage information may indicate the coverage, availability, or unavailability of one or more TN cells, one or more NTN cells (operating in a "normal mode" or non-store and forward mode, for example), one or more NTN cells in store and forward mode, no coverage, location(s), or time(s) (e.g., period(s)) of availability. In some examples, the coverage information may indicate coverage, availability, unavailability of one or more PLMNs or RATs, or may indicate one or more durations (e.g., availability times or periods) of the one or more PLMNs or RATs.

The UE 115-*a* may store location data of the UE 115-*a* or the coverage information at least partially during the period that one or more NTN nodes (e.g., the NTN node 385-*a*) accessible to the UE 115-*a* are operating in the store and forward mode based on receiving the indication 350. For instance, the UE 115-*a* may store the location data or the coverage information in a format associated with the store and forward mode. As described herein, the coverage information may indicate communication availability of one or more nodes 335-*a* to the UE 115-*a*, where the one or more nodes 335-*a* may be associated with a TN or an NTN. The coverage information may include WWAN coverage status information, PLMN availability information, RAT availability information, or any combination thereof.

In some examples, the coverage information may include a first parameter (e.g., WWAN coverage parameter, IE, or WWAN_Coverage_Status_r19, among other examples) indicating availability of a TN cell, availability of an NTN cell, availability of an NTN cell operating in the store and forward mode, no coverage, or any combination thereof, or a second parameter (e.g., PLMN parameter or RAT parameter, IE, or PLMN_RAT_Info_r19, among other examples) indicating availability of a PLMN, availability of a RAT, a duration of availability, or any combination thereof. For instance, the UE 115-*a* may generate, store, or format the coverage information as the first parameter or the second parameter.

The UE 115-*a* may transmit report data indicating the location data or the coverage information. For example, the UE 115-*a* may transmit the report data to the NTN node 385-*a*, to the TN node 370-*a* (when the UE 115-*a* is located in the cell area 310, for example), to another NTN node, or to another TN node. In some examples, the report data may be included in a RRC message, UAI, a MDT report, a message at a layer higher than a physical layer, a NAS message, a user plane message, or any combination thereof.

An example of the report data is given in Listing (1). For instance, Listing (1) illustrates an example of a UEAssistanceInformation message (e.g., UAI). The UEAssistanceInformation message may be utilized for the indication of UE assistance information to the network. The UEAssistanceInformation message may be sent in association with a signaling radio bearer (e.g., SRB1 or SRB3) for radio link control (RLC) for a service access point (SAP) using a logical channel (e.g., a dedicated control channel (DCCH)) from the UE 115-*a* to the network. In some examples, the UEAssistanceInformation message may be communicated in one or more modes (e.g., transparent mode (TM), unacknowledged mode (UM), acknowledge mode (AM), or store and forward mode). In AM, for instance, when the UE 115-*a* transmits the UEAssistanceInformation message to a network node (e.g., NTN node 385-*a* or TN node 370-*a*) via an uplink, the UE 115-*a* may receive an acknowledgment (ACK) via a downlink. In Listing (1), the Location_History_info_r19 may indicate a location history where the UE 115-*a* last visited. The WWAN_Coverage_Status_r19 may indicate the availability of one or more TNs, NTNs (in "normal" or non-store and forward mode), NTNs in store and forward mode, or no coverage, at one or more locations or times. The PLMN_RAT_info_r19 may indicate one or more details regarding the availability or unavailability of one or more PLMNs or RATs (or availability durations, for example).

Listing (1)

```
-- ASN1START
-- TAG-UEASSISTANCEINFORMATION-START
 UEAssistanceInformation ::=      SEQUENCE {
  criticalExtensions          CHOICE {
    ueAssistanceInformation           UEAssistanceInformation-IEs,
    criticalExtensionsFuture         SEQUENCE { }
  }
}
 DelayBudgetReport::=          CHOICE {
  type1                   ENUMERATED {
                          msMinus1280, msMinus640, msMinus320,
                          msMinus160, msMinus80, msMinus60, msMinus40,
                          msMinus20, ms0, ms20, ms40, ms60, ms80, ms160,
                          ms320, ms640, ms1280},
  ...
}
UEAssistance Information-IEs ::=   SEQUENCE {
 Location_History_info_r19         OPTIONAL, -- Need R
WWAN_Coverage_Status_r19          OPTIONAL, -- Need R
PLMN_RAT_info_r19                 OPTIONAL, -- Need R
```

In some approaches, the report data is transmitted to at least one of the one or more NTN nodes (e.g., the NTN node 385-*a*) during the period that the one or more NTN nodes accessible to the UE 115-*a* are operating in the store and forward mode. For instance, the NTN node 385-*a* may obtain (e.g., receive) report data indicating location data of the UE 115-*a* or coverage information collected at least partially during the period that one or more NTN nodes (e.g., the NTN node 385-*a*) accessible to the UE 115-*a* are operating in the store and forward mode based on transmitting the indication 350.

In some cases, the report data may be obtained (e.g., received by the NTN node 385-*a*) in the period that that the one or more NTN nodes accessible to the UE 115-*a* are operating in the store and forward mode. In some approaches, the NTN node 385-*a* may output (e.g., transmit) an indication of rejection of management for the report data obtained in the period. For instance, the NTN node 385-*a* may indicate that the NTN node 385-*a* may not manage the report data (e.g., may not store the report data, may not forward the report data, or may not be relied upon to forward the report data). In some examples, the NTN node 385-*a* may be set up to reject storage and forwarding of report data, may have inadequate storage to store report data from one or more UEs, or may reject management of the report data to cause (e.g., instruct, command) the UE 115-*a* to hold the report data until the report data can be transmitted or relayed to a TN node (e.g., TN node 370-*a*) via a direct link or a feeder link. In some examples, the NTN node 385-*a* may attempt to store and forward the report data while rejecting the management (e.g., responsibility) of the report data. In some examples, the NTN node 385-*a* may transmit the report data to a core network when a second communication link 355 (e.g., feeder link) between the NTN node 385-*a* and the core network is available.

The UE 115-*a* may receive the indication of the rejection of management for the report data transmitted to the at least one of the one or more NTN nodes during the period. The UE 115-*a* may transmit, based on the indication of the rejection, the report data to a TN node (e.g., the TN node 370-*a*) or to an NTN node not operating in the store and forward mode. For example, when a link (e.g., a direct link to a TN node or an indirect link via an NTN node) to the core network is available, the UE 115-*a* may transmit the report data via the link.

In some aspects, the NTN node 385-*a* may output (e.g., transmit) a message to transmit the report data during the period that the one or more NTN nodes (e.g., the NTN node 385-*a*) accessible to the UE 115-*a* are operating in the store and forward mode. The NTN node 385-*a* may obtain the report data is based on the message. For example, the NTN node 385-*a* may output a message (e.g., a command, an instruction, an indication, or information, among other examples) to the UE 115-*a* for the UE 115-*a* to send the report data.

The UE 115-*a* may receive the message from the at least one of the one or more NTN nodes (e.g., the NTN node 385-*a*) to transmit the report data during the period that the one or more NTN nodes (e.g., the NTN node 385-*a*) accessible to the UE 115-*a* are operating in the store and forward mode. The UE 115-*a* may transmit the report data based on (e.g., in response to) the message.

In some aspects, the NTN node 385-*a* may output (e.g., transmit) a request for the location data or the coverage information. The request may be included in a UE information request message or a logged measurement configuration message. For example, the request may be configuration information (e.g., NTN_Satellite_Mode_r19: Store and Forward) to configure the UE 115-*a* to collect, store, or transmit the location information, the coverage information, or the report data. In some cases, the location data or the coverage information may be obtained (e.g., received) at least partially during the period that the NTN node 385-*a* is operating in the store and forward mode based on transmitting the request. For example, the UE 115-*a* may receive the request for the location data or the coverage information (in an information request message or a logged measurement configuration message, for example), where the UE 115-*a* stores the location data or the coverage information at least partially during the period that the one or more NTN nodes accessible to the UE 115-*a* are operating in the store and forward mode based on receiving the request.

In some examples, the location data or coverage information may be requested by the network (e.g., NTN node 385-*a* or TN node 370-*a*) to the UE 115-*a* as part of a logged measurement configuration. The LoggedMeasurementConfiguration message may be utilized to perform logging of measurement results while the UE 115-*a* is in a RRC_IDLE or RRC_INACTIVE state. The LoggedMeasurementConfiguration message may be utilized to transfer the logged measurement configuration for network performance enhancement. An example of the LoggedMeasurementConfiguration message including a NTN_Satellite_Mode_r19 IE is given in Listing (2). For instance, the LoggedMeasurementConfiguration may be sent for RLC for a SAP using a logical channel (e.g., a DCCH) from the network to the UE 115-*a*. In some examples, the LoggedMeasurementConfiguration message may be communicated in one or more modes (e.g., TM, UM, AM, or store and forward mode). In AM, for instance, when a network node (e.g., NTN node 385-*a* or TN node 370-*a*) outputs the LoggedMeasurementConfiguration message to the UE 115-*a* via a downlink, the UE 115-*a* may transmit an ACK via an uplink.

Listing (2)

```
LoggedMeasurementConfiguration-r16-IEs ::= SEQUENCE {
  traceReference-r16              TraceReference-r16,
  traceRecordingSessionRef-r16    OCTET STRING (SIZE (2)),
  tce-Id-r16                      OCTET STRING (SIZE (1)),
  absoluteTimeInfo-r16            Absolute TimeInfo-r16,
  areaConfiguration-r16           AreaConfiguration-r16            OPTIONAL, -- Need R
  plmn-IdentityList-r16           PLMN-IdentityList2-r16           OPTIONAL, -- Need R
  bt-NameList-r16                 SetupRelease {BT-NameList-r16}   OPTIONAL, -- Need M
  wlan-NameList-r16               SetupRelease {WLAN-NameList-r16} OPTIONAL, -- Need M
  sensor-NameList-r16             SetupRelease {Sensor-NameList-r16} OPTIONAL, -- Need M
  loggingDuration-r16             LoggingDuration-r16,
  reportType                      CHOICE {
    periodical                      LoggedPeriodicalReportConfig-r16,
    eventTriggered                  LoggedEventTriggerConfig-r16,
    ...
LoggedMeasurementConfiguration-v1700-IEs ::= SEQUENCE {
  sigLoggedMeasType-r17           ENUMERATED {true}                OPTIONAL, -- Need R
```

-continued

| Listing (2) | | |
|---|---|---|
| earlyMeasIndication-r17 | ENUMERATED {true} | OPTIONAL, -- Need R |
| areaConfiguration-v1700 | AreaConfiguration-v1700 | OPTIONAL, -- Need R |
| nonCriticalExtension | SEQUENCE { } | OPTIONAL |
| NTN_Satellite_Mode_r19 | Normal (Default) Or S&F | OPTIONAL, -- Need R |

Figure 4:
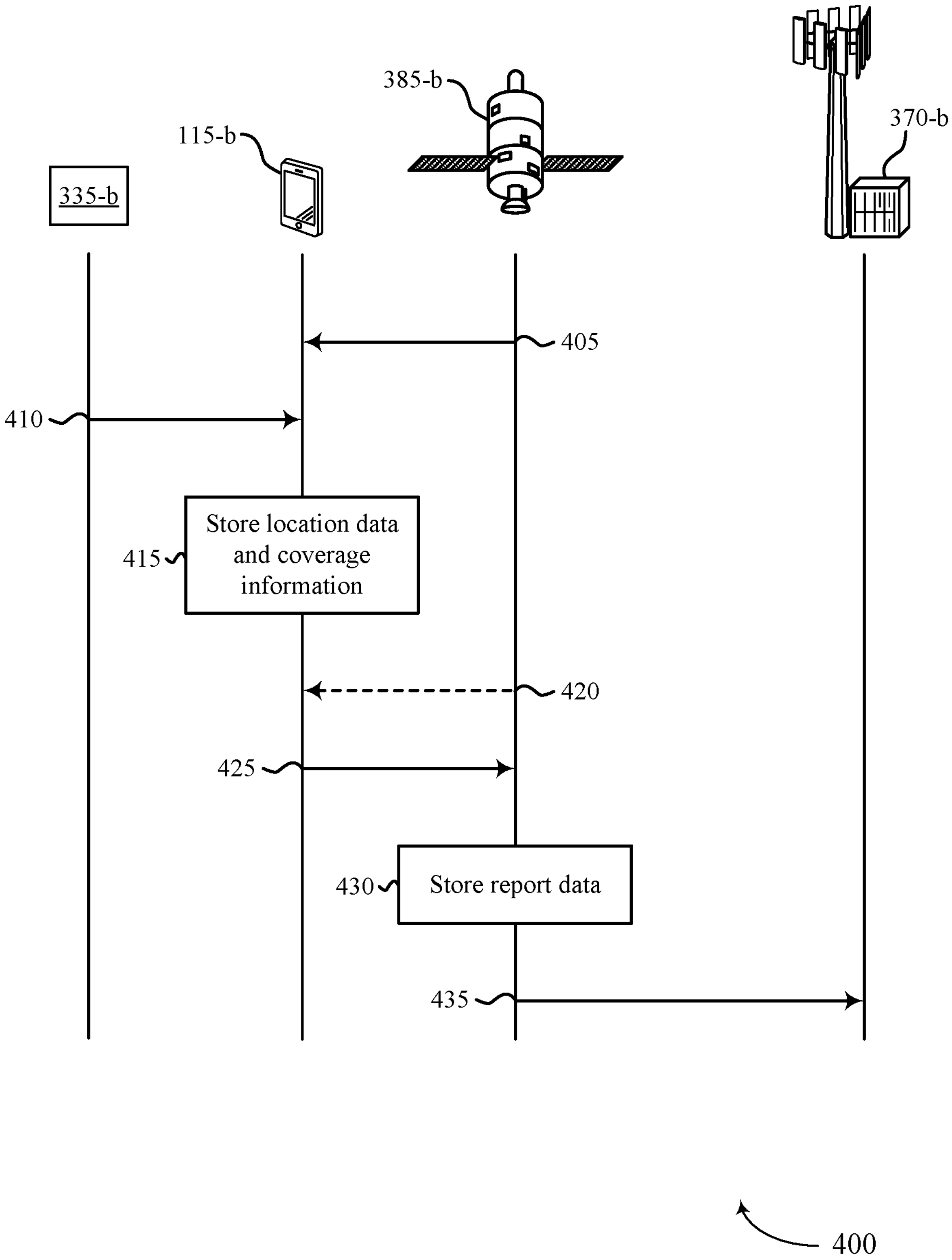
FIG. 4 shows an example of a process flow that supports uplink reports and store and forward mode in accordance with one or more aspects of the present disclosure.

FIG. 4 shows an example of a process flow 400 that supports uplink reports and store and forward mode in accordance with one or more aspects of the present disclosure. The process flow 400 may include a UE 115-*b*, which may be an example of UEs 115, as described herein. The process flow 400 may also include a NTN node 385-*b* and a TN node 370-*b*, which may be respective examples of a NTN node 385-*a* and a TN node 370-*a*, as described herein. The process flow 400 may also include a node 335-*b*, which may be an example of the node 335-*a*, as described herein.

In the following description of the process flow 400, the signaling or communications between the UE 115-*b*, the NTN node 385-*b*, the TN node 370-*b*, and the node 335-*b* may be transmitted in a different order than the example order shown, or the operations performed by the UE 115-*b*, the NTN node 385-*b*, the TN node 370-*b*, and the node 335-*b*, may be performed in different orders or at different times. Some operations may also be omitted from the process flow 400, and other operations may be added to the process flow 400. Further, although some operations or signaling may be shown to occur at different times for discussion purposes, these operations may actually occur at the same time or in overlapping time periods in some examples.

At 405, the NTN node 385-*b* may output (e.g., transmit) an indication that the NTN node 385-*b* is operating in a store and forward mode. For instance, the indication may be transmitted to the UE 115-*b* as described with reference to FIG. 1 or FIG. 3.

At 410, the UE 115-*b* may detect, determine, or receive coverage information from the node 335-*b*. Detecting or receiving coverage information may be performed as described with reference to FIG. 1 or FIG. 3.

At 415, the UE 115-*b* may store location data of the UE 115-*b* and coverage information at least partially during a period that the NTN node 385-*b* is operating in the store and forward mode based on receiving the indication. Storing the location data and coverage information may be performed as described with reference to FIG. 1 or FIG. 3.

At 420, the NTN node 385-*b* may output (e.g., transmit) a message indicating (e.g., commanding or instructing, among other examples) the UE 115-*b* to transmit report data during the period that the NTN node 385-*b* is operating in the store and forward mode. The UE 115-*b* may receive the message. Outputting and receiving the message for the UE 115-*b* to transmit the report data may be performed as described with reference to FIG. 1 or FIG. 3.

At 425, the UE 115-*b* may transmit the report data indicating the location data or the coverage information. Transmitting the report data may be performed as described with reference to FIG. 1 or FIG. 3.

At 430, the NTN node 385-*b* may store the report data. For example, the NTN node 385-*b* may store the report data in memory.

At 435, the NTN node 385-*b* may output (e.g., transmit) the report data to the TN node 370-*b*. For example, the NTN node 385-*b* may forward the report data to the TN node 370-*b* as described with reference to FIG. 1 or FIG. 3.

Figure 5:
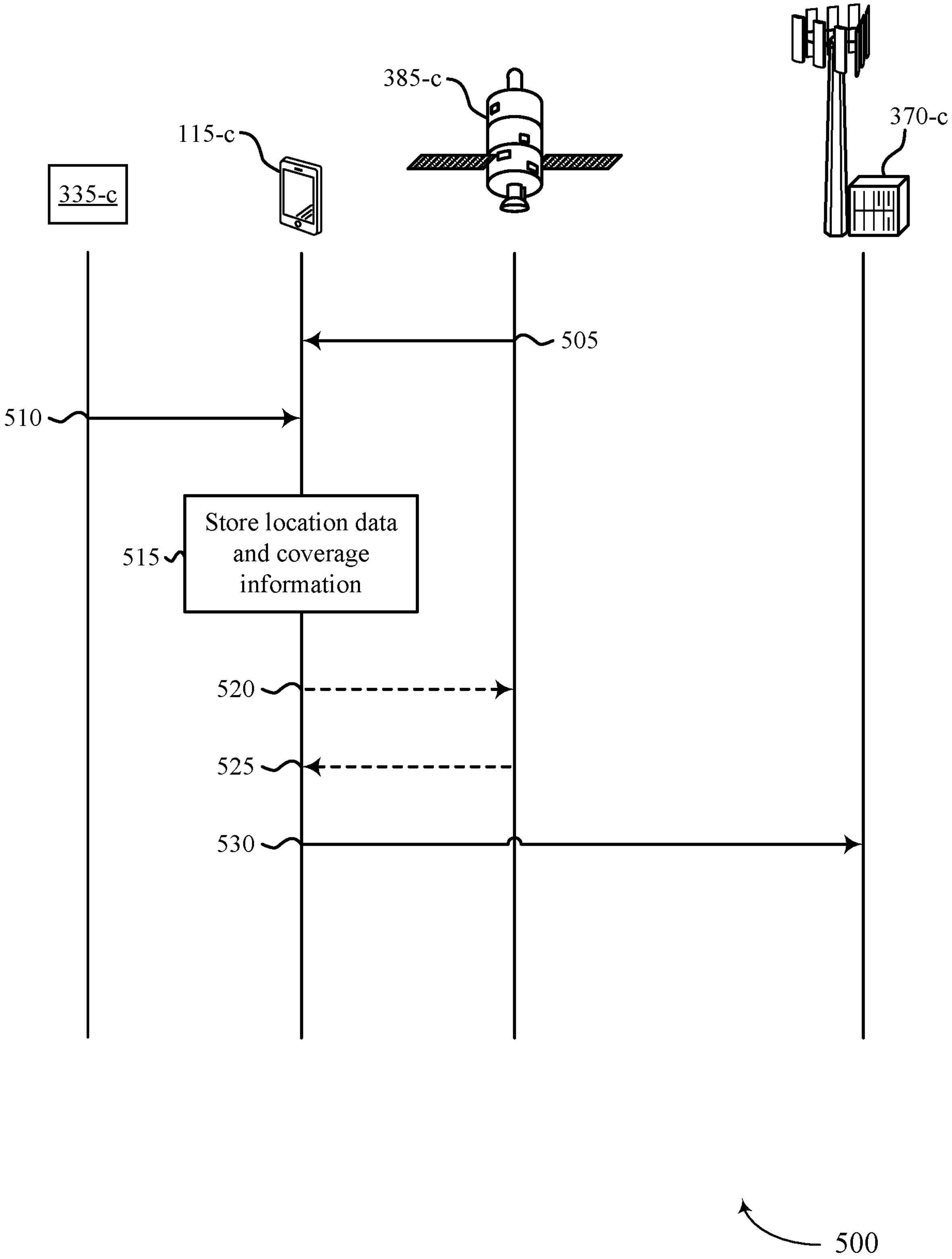
FIG. 5 shows an example of a process flow that supports uplink reports and store and forward mode in accordance with one or more aspects of the present disclosure.

FIG. 5 shows an example of a process flow 500 that supports uplink reports and store and forward mode in accordance with one or more aspects of the present disclosure. The process flow 500 may include a UE 115-*c*, which may be an example of UEs 115, as described herein. The process flow 500 may also include a NTN node 385-*c* and a TN node 370-*c*, which may be respective examples of a NTN node 385-*a* and a TN node 370-*a*, as described herein. The process flow 500 may also include a node 335-*c*, which may be an example of the node 335-*a*, as described herein.

In the following description of the process flow 500, the signaling or communications between the UE 115-*c*, the NTN node 385-*c*, the TN node 370-*c*, and the node 335-*c* may be transmitted in a different order than the example order shown, or the operations performed by the UE 115-*c*, the NTN node 385-*c*, the TN node 370-*c*, and the node 335-*c*, may be performed in different orders or at different times. Some operations may also be omitted from the process flow 500, and other operations may be added to the process flow 500. Further, although some operations or signaling may be shown to occur at different times for discussion purposes, these operations may actually occur at the same time or in overlapping time periods in some examples.

At 505, the NTN node 385-*c* may output (e.g., transmit) an indication that the NTN node 385-*c* is operating in a store and forward mode. For instance, the indication may be transmitted to the UE 115-*c* as described with reference to FIG. 1 or FIG. 3.

At 510, the UE 115-*c* may detect, determine, or receive coverage information from the node 335-*c*. Detecting or receiving coverage information may be performed as described with reference to FIG. 1 or FIG. 3.

At 515, the UE 115-*c* may store location data of the UE 115-*c* and coverage information at least partially during a period that the NTN node 385-*c* is operating in the store and forward mode based on receiving the indication. Storing the location data and coverage information may be performed as described with reference to FIG. 1 or FIG. 3.

At 520, the UE 115-*c* may transmit the report data indicating the location data or the coverage information. Transmitting the report data may be performed as described with reference to FIG. 1 or FIG. 3.

At 525, the NTN node 385-*c* may output (e.g., transmit) an indication of a rejection of management for the report data. The UE 115-*c* may receive the indication. Outputting and receiving the indication of the rejection of management for the report data may be performed as described with reference to FIG. 1 or FIG. 3.

At 530, the UE 115-*c* may transmit the report data. Transmitting the report data may be performed as described with reference to FIG. 1 or FIG. 3. For example, the UE 115-*c* may hold the report data until a link to a core network is available. When the link to the core network is available, the UE 115-*c* may transmit the report data. In some examples, the link to the core network may be via the TN node 370-*c*, via the NTN node 385-*c*, or via another node (e.g., another TN node or another NTN node). In some examples, the NTN node 385-*c* may output (e.g., transmit) the report data (for which management was rejected) to a core network when a link to the core network is available.

Figure 6:
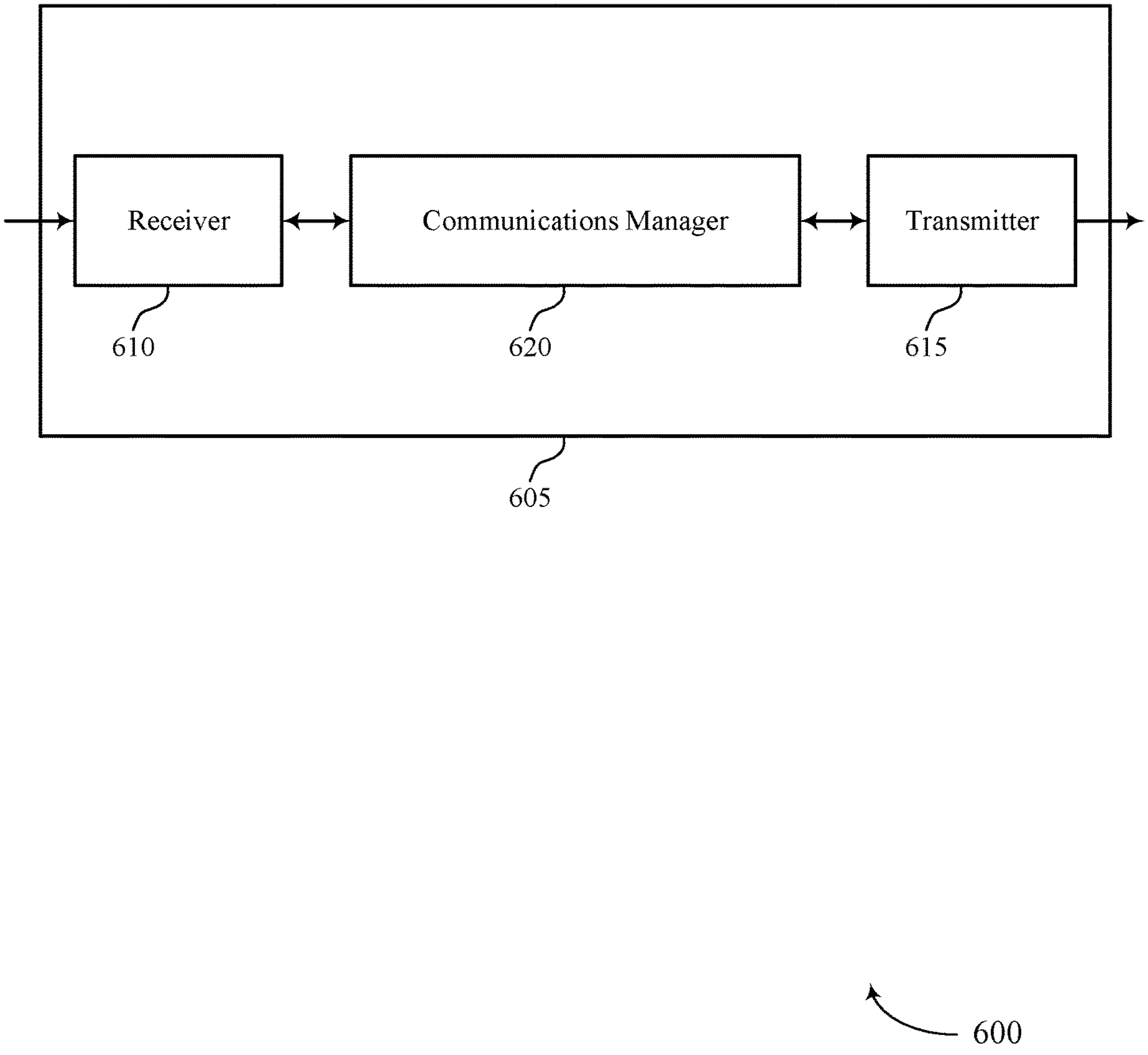
FIGS. 6 and 7 show block diagrams of devices that support uplink reports and store and forward mode in accordance with one or more aspects of the present disclosure.

FIG. 6 shows a block diagram 600 of a device 605 that supports uplink reports and store and forward mode in accordance with one or more aspects of the present disclosure. The device 605 may be an example of aspects of a UE 115 as described herein. The device 605 may include a receiver 610, a transmitter 615, and a communications manager 620. The device 605, or one or more components of the device 605 (e.g., the receiver 610, the transmitter 615, and the communications manager 620), may include at least one processor, which may be coupled with at least one memory, to, individually or collectively, support or enable the described techniques. Each of these components may be in communication with one another (e.g., via one or more buses).

The receiver 610 may provide a means for receiving information such as packets, user data, control information, or any combination thereof associated with various information channels (e.g., control channels, data channels, information channels related to uplink reports and store and forward mode). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to uplink reports and store and forward mode). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of uplink reports and store and forward mode as described herein. For example, the communications manager 620, the receiver 610, the transmitter 615, or various combinations or components thereof may be capable of performing one or more of the functions described herein.

In some examples, the communications manager 620, the receiver 610, the transmitter 615, or various combinations or components thereof may be implemented in hardware (e.g., in communications management circuitry). The hardware may include at least one of a processor, a digital signal processor (DSP), a central processing unit (CPU), an application-specific integrated circuit (ASIC), a field-programmable gate array (FPGA) or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 620, the receiver 610, the transmitter 615, or various combinations or components thereof may be implemented in code (e.g., as communications management software or firmware) executed by at least one processor. If implemented in code executed by at least one processor, the functions of the communications manager 620, the receiver 610, the transmitter 615, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 620 may be configured to perform various operations (e.g., receiving, obtaining, monitoring, outputting, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to obtain information, output information, or perform various other operations as described herein.

For example, the communications manager 620 is capable of, configured to, or operable to support a means for receiving an indication that a first NTN node accessible to the UE is operating in a store and forward mode. The communications manager 620 is capable of, configured to, or operable to support a means for storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN. The communications manager 620 is capable of, configured to, or operable to support a means for transmitting report data indicating the location data and the coverage information.

By including or configuring the communications manager 620 in accordance with examples as described herein, the device 605 (e.g., at least one processor controlling or otherwise coupled with the receiver 610, the transmitter 615, the communications manager 620, or a combination thereof) may support techniques for reduced processing, reduced power consumption, or more efficient utilization of communication resources.

Figure 7:
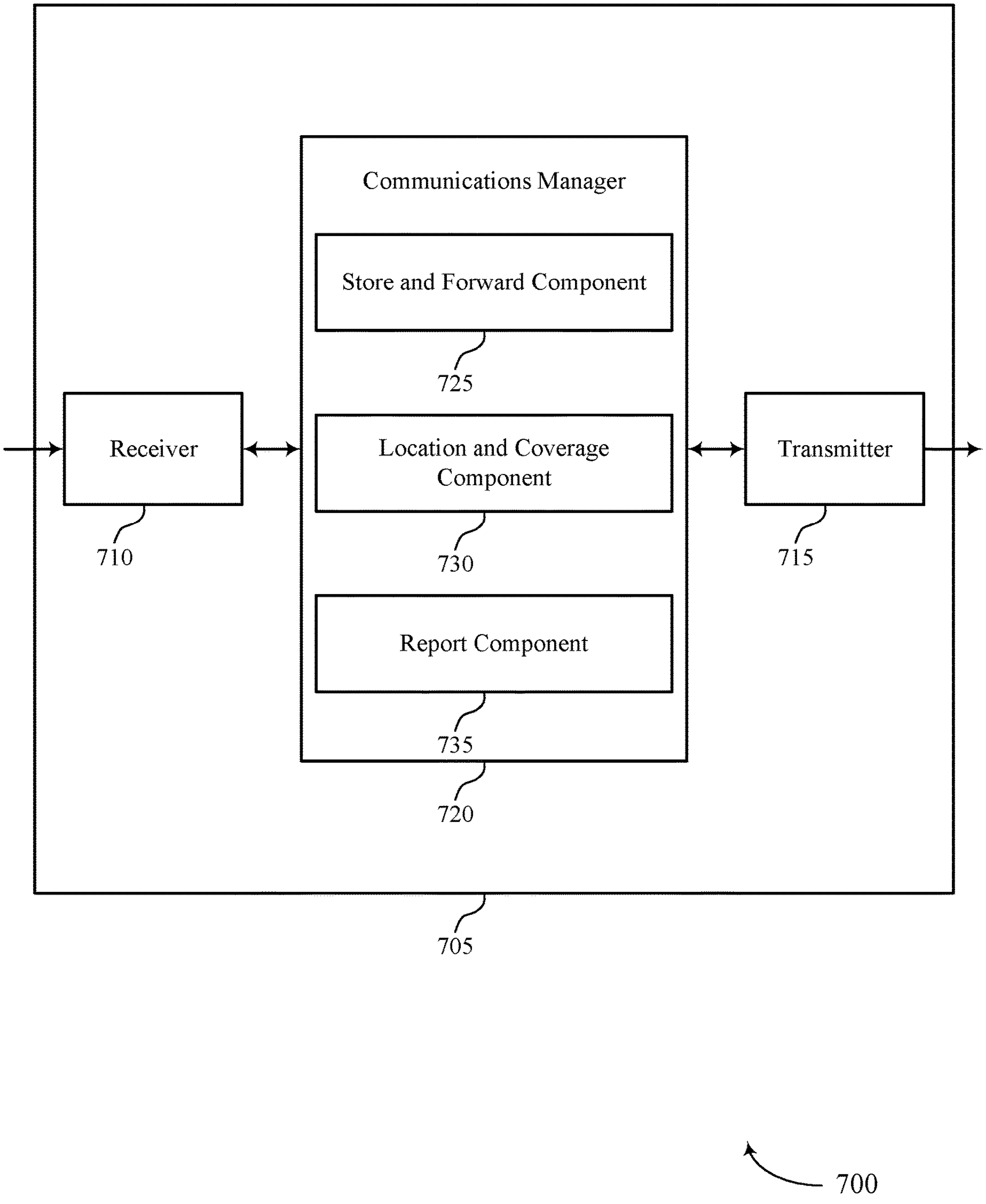

FIG. 7 shows a block diagram 700 of a device 705 that supports uplink reports and store and forward mode in accordance with one or more aspects of the present disclosure. The device 705 may be an example of aspects of a device 605 or a UE 115 as described herein. The device 705 may include a receiver 710, a transmitter 715, and a communications manager 720. The device 705, or one or more components of the device 705 (e.g., the receiver 710, the transmitter 715, and the communications manager 720), may include at least one processor, which may be coupled with at least one memory, to support the described techniques. Each of these components may be in communication with one another (e.g., via one or more buses).

The receiver 710 may provide a means for receiving information such as packets, user data, control information, or any combination thereof associated with various information channels (e.g., control channels, data channels, information channels related to uplink reports and store and forward mode). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to uplink reports and store and forward mode). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of uplink reports and store and forward mode as described herein. For example, the communications manager 720 may include a store and forward component 725, a location and coverage component 730, a report component 735, or any combination thereof. The communications manager 720 may be an example of aspects of a communications manager 620 as described herein. In some examples, the communications manager 720, or various components thereof, may be configured to perform various operations (e.g., receiving, obtaining, monitoring, outputting, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to obtain information, output information, or perform various other operations as described herein.

The store and forward component 725 is capable of, configured to, or operable to support a means for receiving an indication that a first NTN node accessible to the UE is operating in a store and forward mode. The location and coverage component 730 is capable of, configured to, or operable to support a means for storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN. The report component 735 is capable of, configured to, or operable to support a means for transmitting report data indicating the location data and the coverage information.

Figure 8:
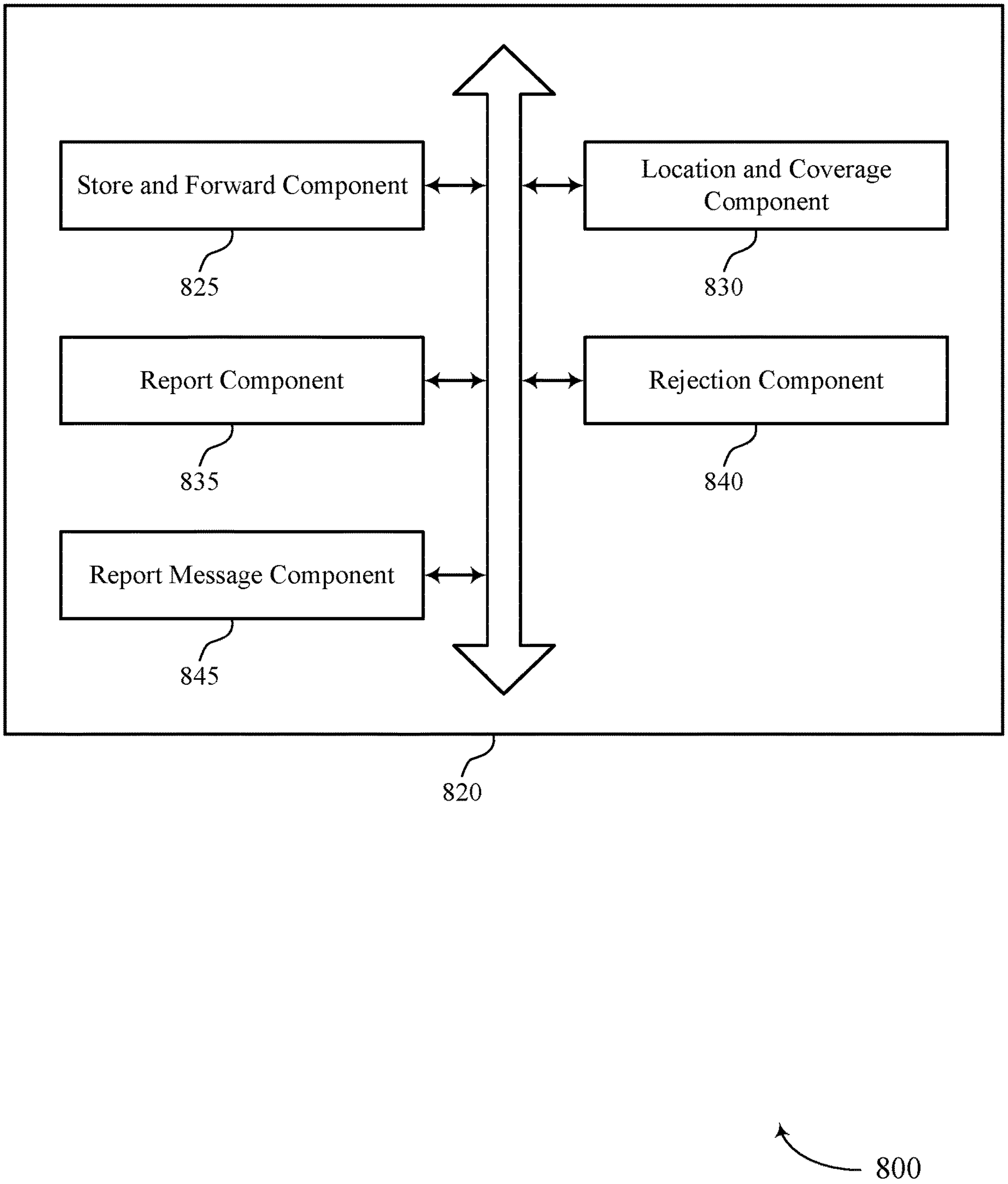
FIG. 8 shows a block diagram of a communications manager that supports uplink reports and store and forward mode in accordance with one or more aspects of the present disclosure.

FIG. 8 shows a block diagram 800 of a communications manager 820 that supports uplink reports and store and forward mode in accordance with one or more aspects of the present disclosure. The communications manager 820 may be an example of aspects of a communications manager 620, a communications manager 720, or both, as described herein. The communications manager 820, or various components thereof, may be an example of means for performing various aspects of uplink reports and store and forward mode as described herein. For example, the communications manager 820 may include a store and forward component 825, a location and coverage component 830, a report component 835, a rejection component 840, a report message component 845, or any combination thereof. Each of these components, or components or subcomponents thereof (e.g., one or more processors, one or more memories), may communicate, directly or indirectly, with one another (e.g., via one or more buses).

The store and forward component 825 is capable of, configured to, or operable to support a means for receiving an indication that a first NTN node accessible to the UE is operating in a store and forward mode. The location and coverage component 830 is capable of, configured to, or operable to support a means for storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN. The report component 835 is capable of, configured to, or operable to support a means for transmitting report data indicating the location data and the coverage information.

In some examples, the report data is transmitted to at least one of the one or more NTN nodes during the period that the one or more NTN nodes accessible to the UE are operating in the store and forward mode.

In some examples, the rejection component 840 is capable of, configured to, or operable to support a means for receiving an indication of a rejection of management for the report data transmitted to the at least one of the one or more NTN nodes during the period. In some examples, the report component 835 is capable of, configured to, or operable to support a means for transmitting, based on the indication of the rejection, the report data to a TN node or to an NTN node not operating in the store and forward mode.

In some examples, the report message component 845 is capable of, configured to, or operable to support a means for receiving a message from the at least one of the one or more NTN nodes to transmit the report data during the period that the one or more NTN nodes accessible to the UE are operating in the store and forward mode, where transmitting the report data is based on the message.

In some examples, to support transmitting the report data, the report component 835 is capable of, configured to, or operable to support a means for transmitting the report data to a terrestrial network node.

In some examples, the location and coverage component 830 is capable of, configured to, or operable to support a means for receiving a request for the location data and the coverage information, the request being included in a UE information request message or a logged measurement configuration message, where the location data and the coverage information are stored at least partially during the period that the one or more NTN nodes accessible to the UE are operating in the store and forward mode based on receiving the request.

In some examples, the coverage information includes wireless wide area network coverage status information, PLMN availability information, RAT availability information, or any combination thereof.

In some examples, the coverage information includes a first parameter indicating availability of a TN cell, availability of an NTN cell, availability of an NTN cell operating in the store and forward mode, no coverage, or any combination thereof, and a second parameter indicating availability of a PLMN, availability of a RAT, a duration of availability, or any combination thereof.

In some examples, the report data is included in an RRC message, UAI, a MDT report, a message at a layer higher than a physical layer, a non-access stratum (NAS) message, a user plane message, or any combination thereof.

Figure 9:
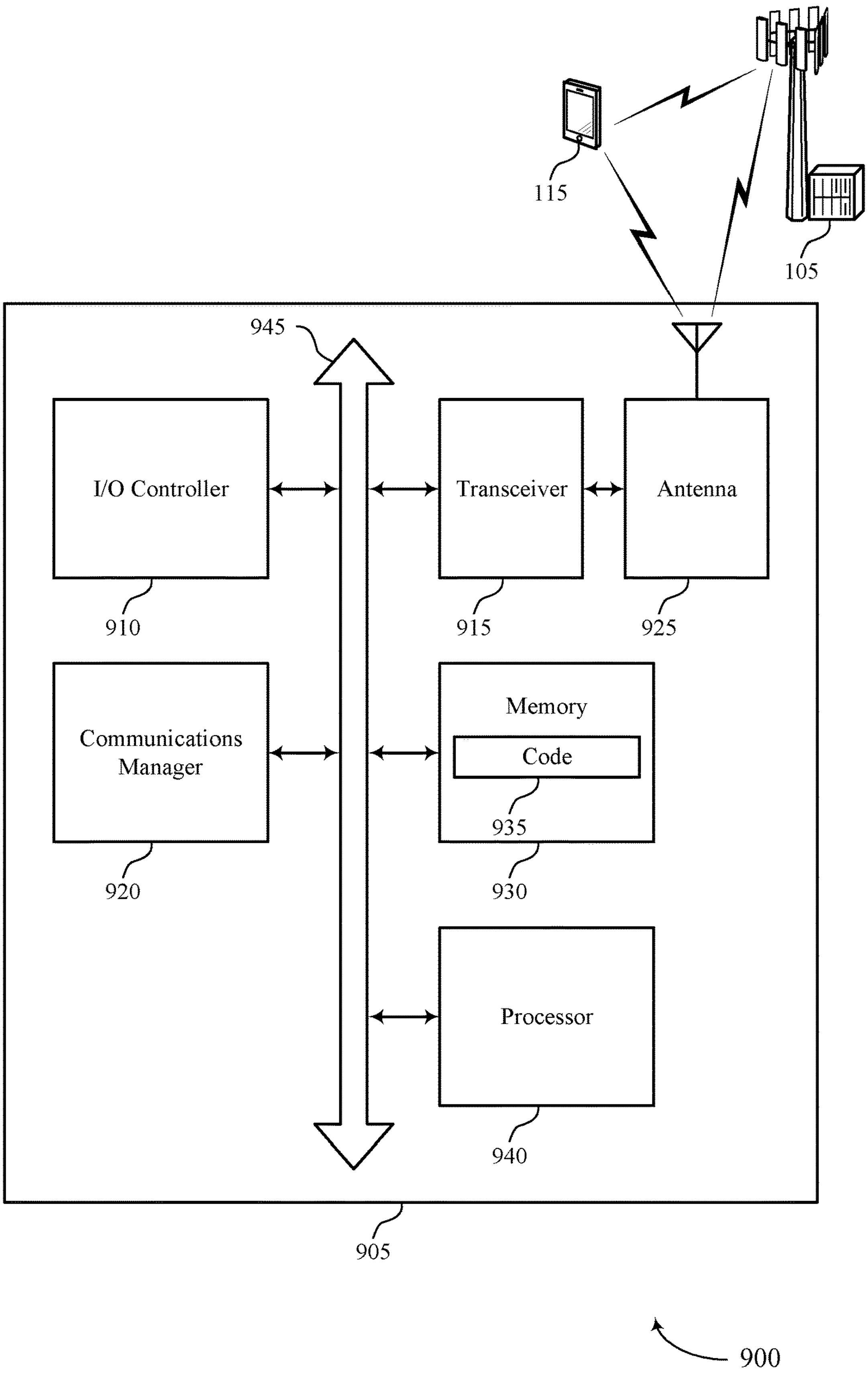
FIG. 9 shows a diagram of a system including a device that supports uplink reports and store and forward mode in accordance with one or more aspects of the present disclosure.

FIG. 9 shows a diagram of a system 900 including a device 905 that supports uplink reports and store and forward mode in accordance with one or more aspects of the present disclosure. The device 905 may be an example of or include the components of a device 605, a device 705, or a UE 115 as described herein. The device 905 may communicate (e.g., wirelessly) with one or more network entities

105, one or more UEs 115, or any combination thereof. The device 905 may include components for bi-directional voice and data communications including components for transmitting and receiving communications, such as a communications manager 920, an input/output (I/O) controller 910, a transceiver 915, an antenna 925, at least one memory 930, code 935, and at least one processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally, or alternatively, the I/O controller 910 may represent or interact with a modem, a keyboard, a mouse, a touchscreen, or a similar device. In some cases, the I/O controller 910 may be implemented as part of one or more processors, such as the at least one processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The at least one memory 930 may include random access memory (RAM) and read-only memory (ROM). The at least one memory 930 may store computer-readable, computer-executable code 935 including instructions that, when executed by the at least one processor 940, cause the device 905 to perform various functions described herein. The code 935 may be stored in a non-transitory computer-readable medium such as system memory or another type of memory. In some cases, the code 935 may not be directly executable by the at least one processor 940 but may cause a computer (e.g., when compiled and executed) to perform functions described herein. In some cases, the at least one memory 930 may contain, among other things, a basic I/O system (BIOS) which may control basic hardware or software operation such as the interaction with peripheral components or devices.

The at least one processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the at least one processor 940 may be configured to operate a memory array using a memory controller. In some other cases, a memory controller may be integrated into the at least one processor 940. The at least one processor 940 may be configured to execute computer-readable instructions stored in a memory (e.g., the at least one memory 930) to cause the device 905 to perform various functions (e.g., functions or tasks supporting uplink reports and store and forward mode). For example, the device 905 or a component of the device 905 may include at least one processor 940 and at least one memory 930 coupled with or to the at least one processor 940, the at least one processor 940 and at least one memory 930 configured to perform various functions described herein. In some examples, the at least one processor 940 may include multiple processors and the at least one memory 930 may include multiple memories. One or more of the multiple processors may be coupled with one or more of the multiple memories, which may, individually or collectively, be configured to perform various functions herein. In some examples, the at least one processor 940 may be a component of a processing system, which may refer to a system (such as a series) of machines, circuitry (including, for example, one or both of processor circuitry (which may include the at least one processor 940) and memory circuitry (which may include the at least one memory 930)), or components, that receives or obtains inputs and processes the inputs to produce, generate, or obtain a set of outputs. The processing system may be configured to perform one or more of the functions described herein. For example, the at least one processor 940 or a processing system including the at least one processor 940 may be configured to, configurable to, or operable to cause the device 905 to perform one or more of the functions described herein. Further, as described herein, being "configured to," being "configurable to," and being "operable to" may be used interchangeably and may be associated with a capability, when executing code stored in the at least one memory 930 or otherwise, to perform one or more of the functions described herein.

For example, the communications manager 920 is capable of, configured to, or operable to support a means for receiving an indication that a first NTN node accessible to the UE is operating in a store and forward mode. The communications manager 920 is capable of, configured to, or operable to support a means for storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN. The communications manager 920 is capable of, configured to, or operable to support a means for transmitting report data indicating the location data and the coverage information.

By including or configuring the communications manager 920 in accordance with examples as described herein, the device 905 may support techniques for improved communication reliability, reduced latency, reduced power consumption, more efficient utilization of communication resources, improved coordination between devices, longer battery life, or improved utilization of processing capability.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the at least one processor 940, the at least one memory 930, the code 935, or any combination thereof. For example, the code 935 may include instructions executable by the at least one processor 940 to cause the device 905 to perform various aspects of uplink reports and store and forward mode as described herein, or the at least one processor 940 and the at least one memory 930 may be otherwise configured to, individually or collectively, perform or support such operations.

Figure 10:
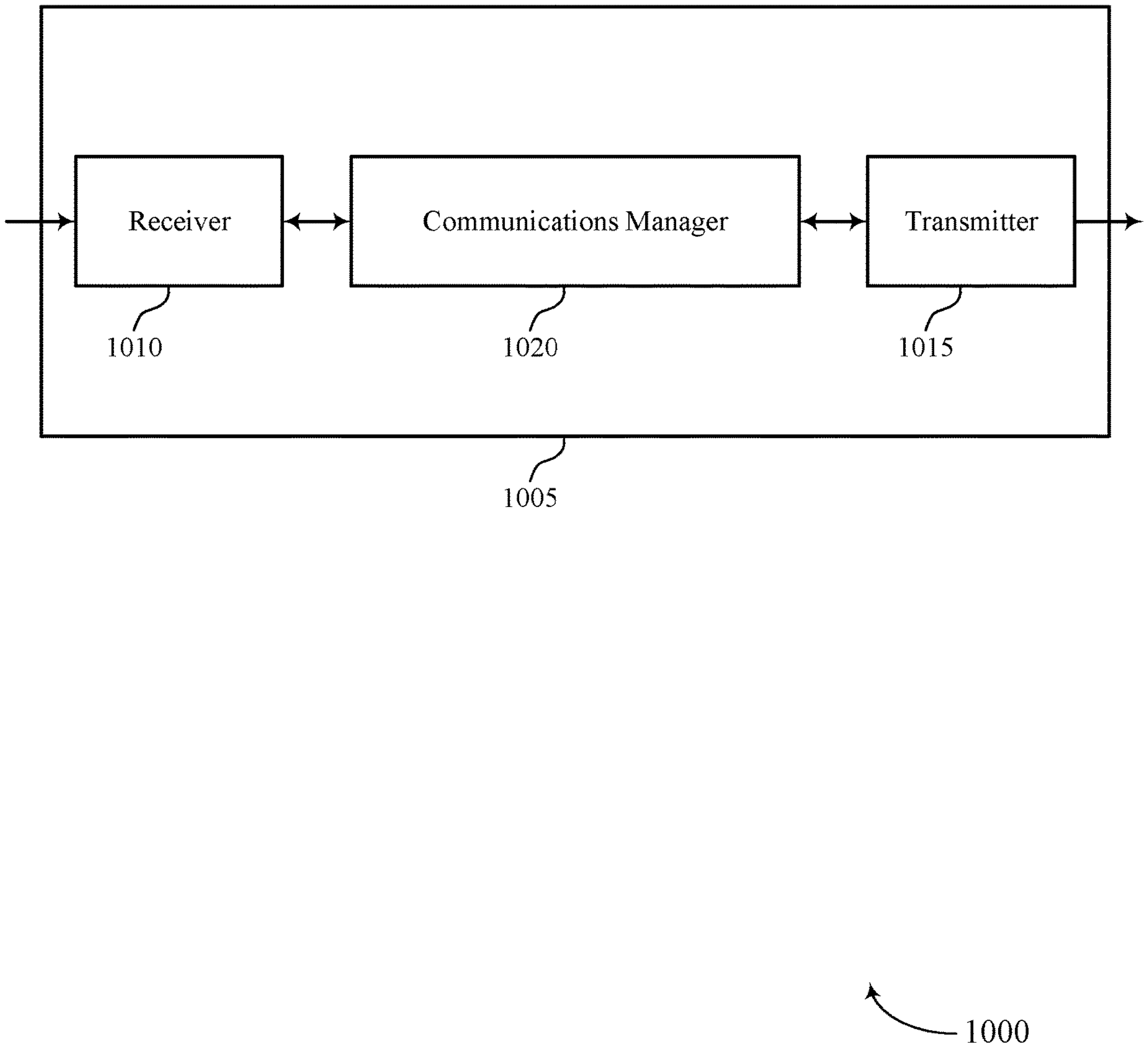
FIGS. 10 and 11 show block diagrams of devices that support uplink reports and store and forward mode in accordance with one or more aspects of the present disclosure.

FIG. 10 shows a block diagram 1000 of a device 1005 that supports uplink reports and store and forward mode in accordance with one or more aspects of the present disclosure. The device 1005 may be an example of aspects of a NTN node as described herein. The device 1005 may include a receiver 1010, a transmitter 1015, and a communications manager 1020. The device 1005, or one or more components of the device 1005 (e.g., the receiver 1010, the transmitter 1015, and the communications manager 1020), may include at least one processor, which may be coupled with at least one memory, to, individually or collectively, support or enable the described techniques. Each of these components may be in communication with one another (e.g., via one or more buses).

The receiver 1010 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1005. In some examples, the receiver 1010 may support obtaining information by receiving signals via one or more antennas. Additionally, or alternatively, the receiver 1010 may support obtaining information by receiving signals via one or more wired (e.g., electrical, fiber optic) interfaces, wireless interfaces, or any combination thereof.

The transmitter 1015 may provide a means for outputting (e.g., transmitting, providing, conveying, sending) information generated by other components of the device 1005. For example, the transmitter 1015 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1015 may support outputting information by transmitting signals via one or more antennas. Additionally, or alternatively, the transmitter 1015 may support outputting information by transmitting signals via one or more wired (e.g., electrical, fiber optic) interfaces, wireless interfaces, or any combination thereof. In some examples, the transmitter 1015 and the receiver 1010 may be co-located in a transceiver, which may include or be coupled with a modem.

The communications manager 1020, the receiver 1010, the transmitter 1015, or various combinations thereof or various components thereof may be examples of means for performing various aspects of uplink reports and store and forward mode as described herein. For example, the communications manager 1020, the receiver 1010, the transmitter 1015, or various combinations or components thereof may be capable of performing one or more of the functions described herein.

In some examples, the communications manager 1020, the receiver 1010, the transmitter 1015, or various combinations or components thereof may be implemented in hardware (e.g., in communications management circuitry). The hardware may include at least one of a processor, a DSP, a CPU, an ASIC, an FPGA or other programmable logic device, a microcontroller, discrete gate or transistor logic, discrete hardware components, or any combination thereof configured as or otherwise supporting, individually or collectively, a means for performing the functions described in the present disclosure. In some examples, at least one processor and at least one memory coupled with the at least one processor may be configured to perform one or more of the functions described herein (e.g., by one or more processors, individually or collectively, executing instructions stored in the at least one memory).

Additionally, or alternatively, the communications manager 1020, the receiver 1010, the transmitter 1015, or various combinations or components thereof may be implemented in code (e.g., as communications management software or firmware) executed by at least one processor. If implemented in code executed by at least one processor, the functions of the communications manager 1020, the receiver 1010, the transmitter 1015, or various combinations or components thereof may be performed by a general-purpose processor, a DSP, a CPU, an ASIC, an FPGA, a microcontroller, or any combination of these or other programmable logic devices (e.g., configured as or otherwise supporting, individually or collectively, a means for performing the functions described in the present disclosure).

In some examples, the communications manager 1020 may be configured to perform various operations (e.g., receiving, obtaining, monitoring, outputting, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to obtain information, output information, or perform various other operations as described herein.

For example, the communications manager 1020 is capable of, configured to, or operable to support a means for transmitting an indication that the NTN node is operating in a store and forward mode. The communications manager 1020 is capable of, configured to, or operable to support a means for obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

By including or configuring the communications manager 1020 in accordance with examples as described herein, the device 1005 (e.g., at least one processor controlling or otherwise coupled with the receiver 1010, the transmitter 1015, the communications manager 1020, or a combination thereof) may support techniques for reduced processing, reduced power consumption, more efficient utilization of communication resources.

Figure 11:
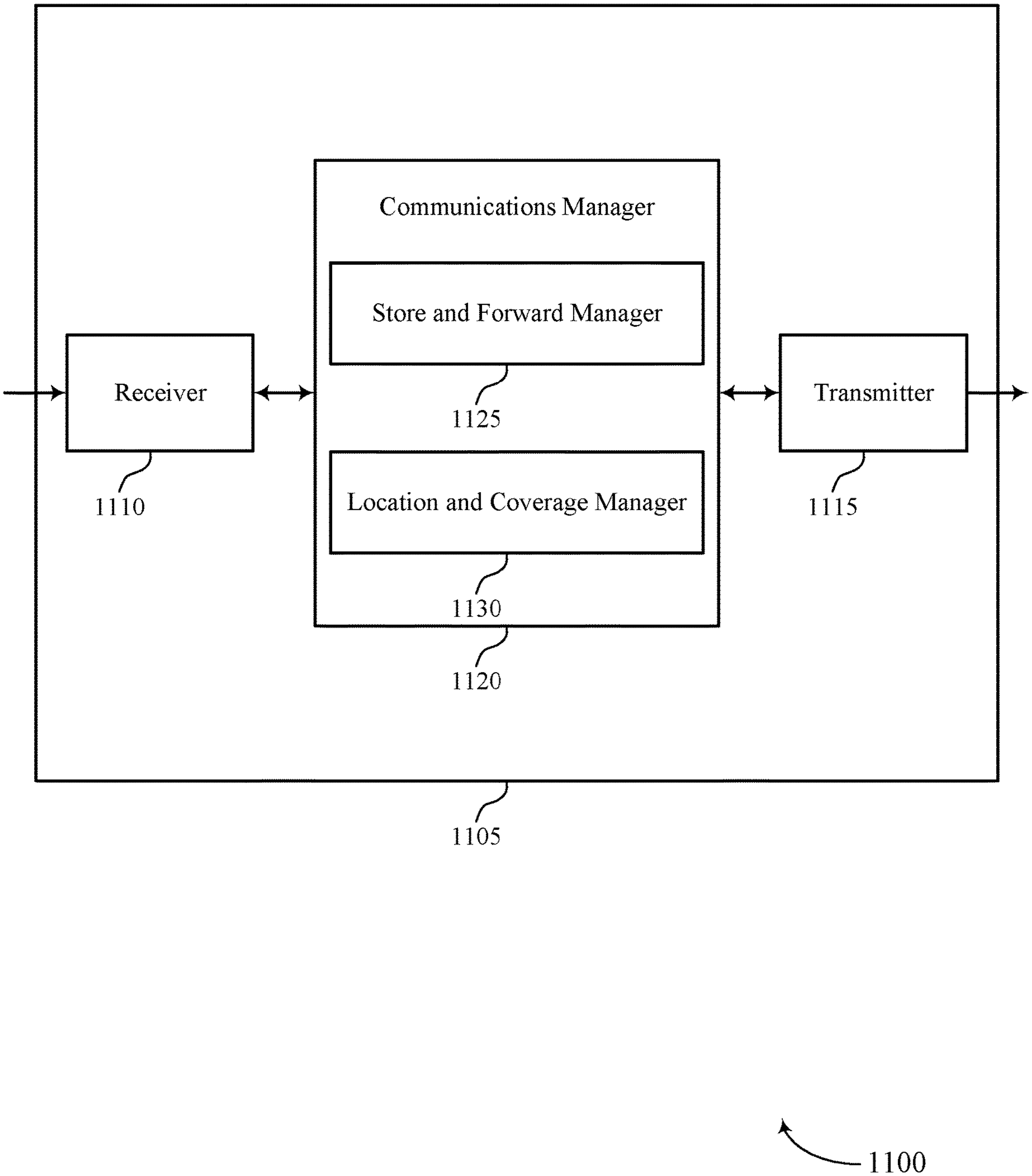

FIG. 11 shows a block diagram 1100 of a device 1105 that supports uplink reports and store and forward mode in accordance with one or more aspects of the present disclosure. The device 1105 may be an example of aspects of a device 1005 or a network entity 105 (e.g., NTN node 185) as described herein. The device 1105 may include a receiver 1110, a transmitter 1115, and a communications manager 1120. The device 1105, or one or more components of the device 1105 (e.g., the receiver 1110, the transmitter 1115, and the communications manager 1120), may include at least one processor, which may be coupled with at least one memory, to support the described techniques. Each of these components may be in communication with one another (e.g., via one or more buses).

The receiver 1110 may provide a means for obtaining (e.g., receiving, determining, identifying) information such as user data, control information, or any combination thereof (e.g., I/Q samples, symbols, packets, protocol data units, service data units) associated with various channels (e.g., control channels, data channels, information channels, channels associated with a protocol stack). Information may be passed on to other components of the device 1105. In some examples, the receiver 1110 may support obtaining information by receiving signals via one or more antennas. Additionally, or alternatively, the receiver 1110 may support obtaining information by receiving signals via one or more wired (e.g., electrical, fiber optic) interfaces, wireless interfaces, or any combination thereof.

The transmitter 1115 may provide a means for outputting (e.g., transmitting, providing, conveying, sending) information generated by other components of the device 1105. For example, the transmitter 1115 may output information such as user data, control information, or any combination thereof (e.g., I/Q samples, symbols, packets, protocol data units, service data units) associated with various channels (e.g., control channels, data channels, information channels, channels associated with a protocol stack). In some examples, the transmitter 1115 may support outputting information by transmitting signals via one or more antennas. Additionally, or alternatively, the transmitter 1115 may support outputting information by transmitting signals via one or more wired (e.g., electrical, fiber optic) interfaces, wireless interfaces, or any combination thereof. In some examples, the transmitter 1115 and the receiver 1110 may be co-located in a transceiver, which may include or be coupled with a modem.

The device 1105, or various components thereof, may be an example of means for performing various aspects of uplink reports and store and forward mode as described herein. For example, the communications manager 1120 may include a store and forward manager 1125 a location and coverage manager 1130, or any combination thereof. The communications manager 1120 may be an example of aspects of a communications manager 1020 as described herein. In some examples, the communications manager 1120, or various components thereof, may be configured to perform various operations (e.g., receiving, obtaining, monitoring, outputting, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to obtain information, output information, or perform various other operations as described herein.

The store and forward manager 1125 is capable of, configured to, or operable to support a means for transmitting an indication that the NTN node is operating in a store and forward mode. The location and coverage manager 1130 is capable of, configured to, or operable to support a means for obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

Figure 12:
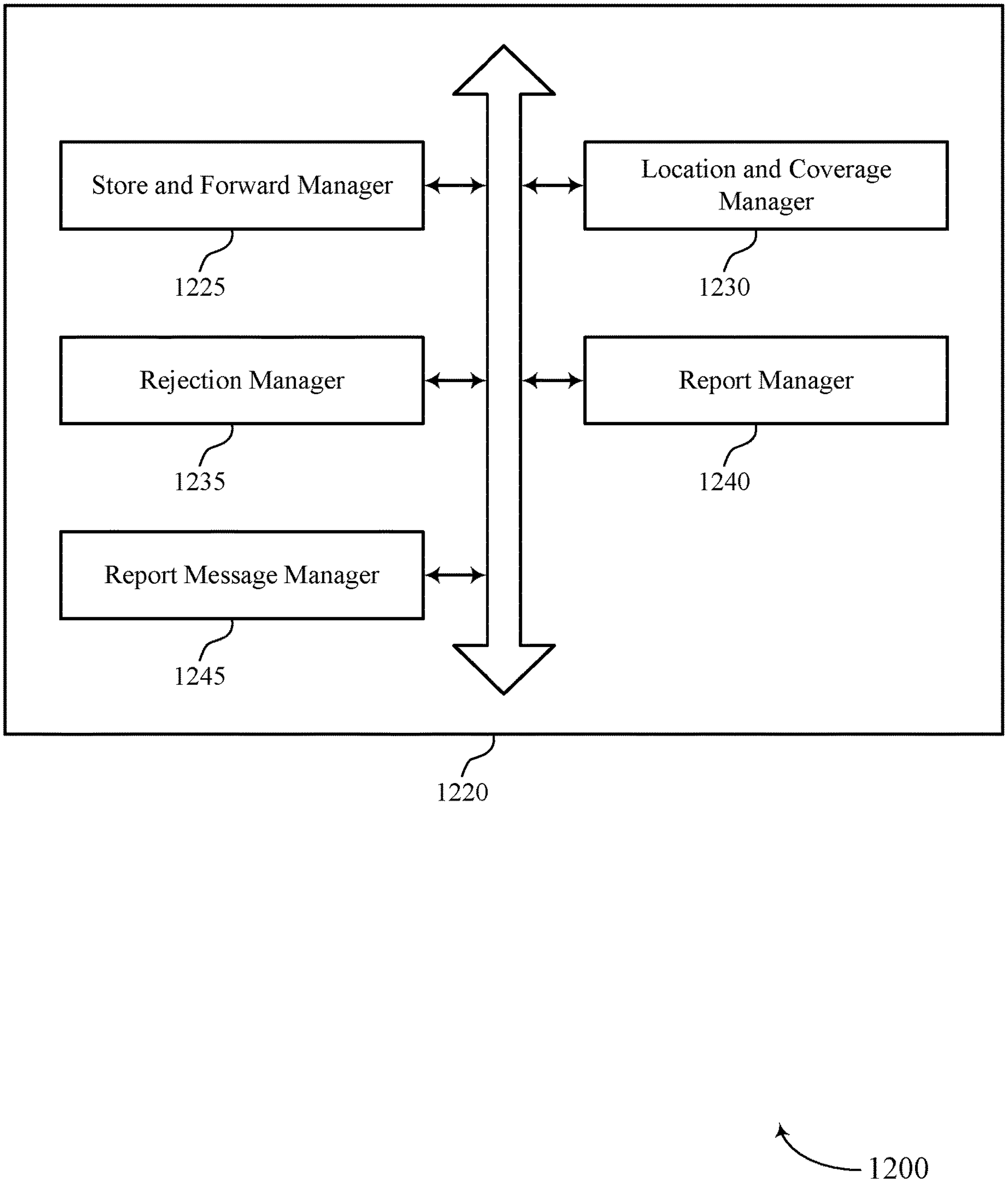
FIG. 12 shows a block diagram of a communications manager that supports uplink reports and store and forward mode in accordance with one or more aspects of the present disclosure.

FIG. 12 shows a block diagram 1200 of a communications manager 1220 that supports uplink reports and store and forward mode in accordance with one or more aspects of the present disclosure. The communications manager 1220 may be an example of aspects of a communications manager 1020, a communications manager 1120, or both, as described herein. The communications manager 1220, or various components thereof, may be an example of means for performing various aspects of uplink reports and store and forward mode as described herein. For example, the communications manager 1220 may include a store and forward manager 1225, a location and coverage manager 1230, a rejection manager 1235, a report manager 1240, a report message manager 1245, or any combination thereof. Each of these components, or components or subcomponents thereof (e.g., one or more processors, one or more memories), may communicate, directly or indirectly, with one another (e.g., via one or more buses).

The store and forward manager 1225 is capable of, configured to, or operable to support a means for transmitting an indication that the NTN node is operating in a store and forward mode. The location and coverage manager 1230 is capable of, configured to, or operable to support a means for obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

In some examples, the report data is obtained in the period that that the one or more NTN nodes accessible to the UE are operating in the store and forward mode.

In some examples, the rejection manager 1235 is capable of, configured to, or operable to support a means for transmitting an indication of rejection of management for the report data obtained in the period.

In some examples, the report manager 1240 is capable of, configured to, or operable to support a means for transmitting the report data to a core network when a feeder link between the NTN node and the core network is available.

In some examples, the report message manager 1245 is capable of, configured to, or operable to support a means for transmitting a message to transmit the report data during the period that the one or more NTN nodes accessible to the UE are operating in the store and forward mode, where obtaining the report data is based on the message.

In some examples, the location and coverage manager 1230 is capable of, configured to, or operable to support a means for transmitting a request for the location data and the coverage information, the request being included in a UE information request message or a logged measurement configuration message, where the location data and the coverage information are obtained at least partially during the period that the NTN node is operating in the store and forward mode based on transmitting the request.

In some examples, the coverage information includes wireless wide area network coverage status information, PLMN availability information, RAT availability information, or any combination thereof.

In some examples, the coverage information includes a first parameter indicating availability of a TN cell, availability of an NTN cell, availability of an NTN cell operating in the store and forward mode, no coverage, or any combination thereof, and a second parameter indicating availability of a PLMN, availability of a RAT, a duration of availability, or any combination thereof.

In some examples, the report data is included in an RRC message, UAI, a MDT report, a message at a layer higher than a physical layer, a non-access stratum (NAS) message, a user plane message, or any combination thereof.

Figure 13:
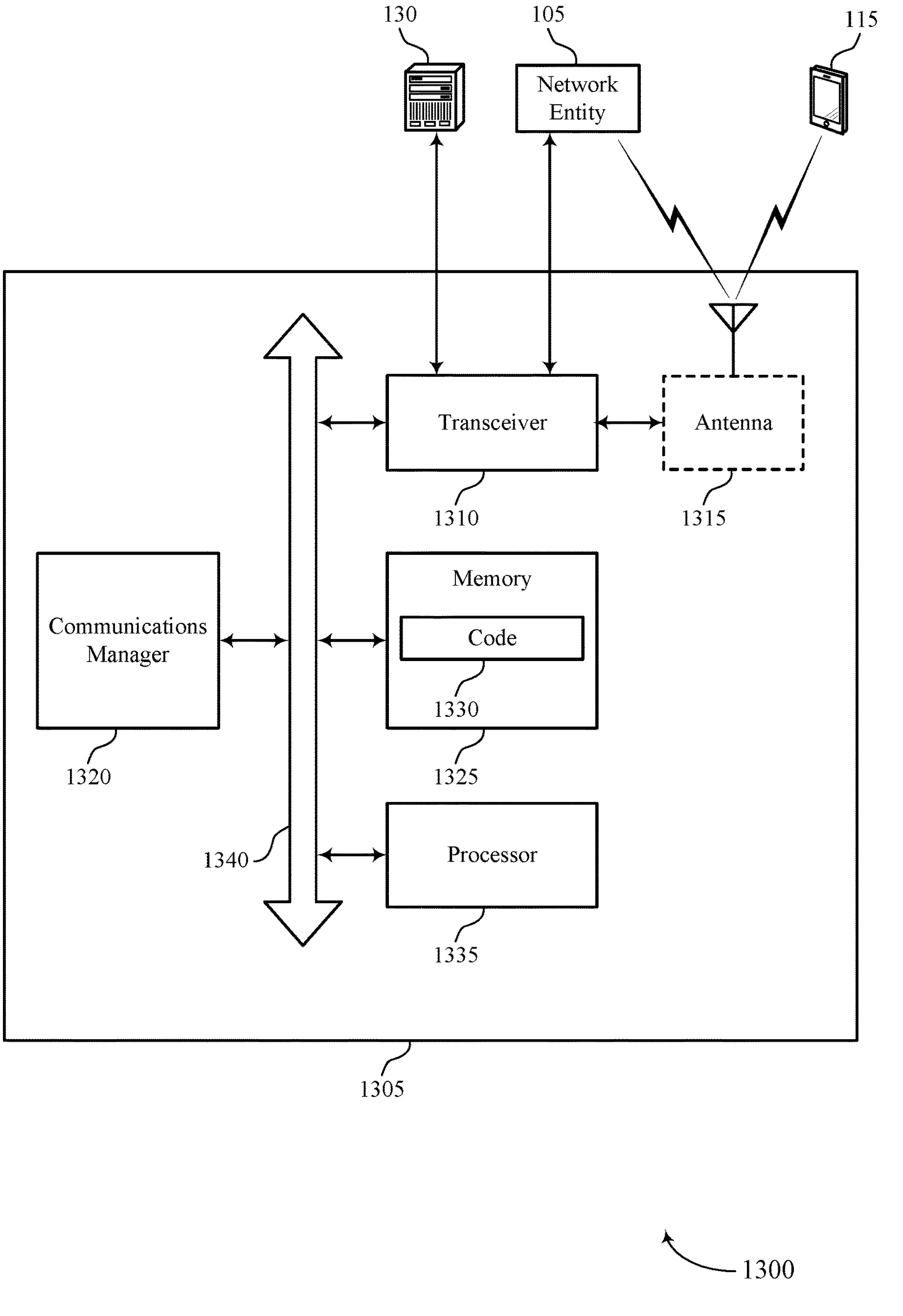
FIG. 13 shows a diagram of a system including a device that supports uplink reports and store and forward mode in accordance with one or more aspects of the present disclosure.

FIG. 13 shows a diagram of a system 1300 including a device 1305 that supports uplink reports and store and forward mode in accordance with one or more aspects of the present disclosure. The device 1305 may be an example of or include the components of a device 1005, a device 1105, or a NTN node as described herein. The device 1305 may include components for bi-directional voice and data communications including components for transmitting and receiving communications, such as a communications manager 1320, a transceiver 1310, an antenna 1315, at least one memory 1325, code 1330, and at least one processor 1335. These components may be in electronic communication or otherwise coupled (e.g., operatively, communicatively, functionally, electronically, electrically) via one or more buses (e.g., a bus 1340).

The transceiver 1310 may support bi-directional communications via wired links, wireless links, or both as described herein. In some examples, the transceiver 1310 may include a wired transceiver and may communicate bi-directionally with another wired transceiver. Additionally, or alternatively, in some examples, the transceiver 1310 may include a wireless transceiver and may communicate bi-directionally with another wireless transceiver. In some examples, the device 1305 may include one or more antennas 1315, which may be capable of transmitting or receiving wireless transmissions (e.g., concurrently). The transceiver 1310 may also include a modem to modulate signals, to provide the modulated signals for transmission (e.g., by one or more antennas 1315, by a wired transmitter), to receive modulated signals (e.g., from one or more antennas 1315, from a wired receiver), and to demodulate signals. In some implementations, the transceiver 1310 may include one or more interfaces, such as one or more interfaces coupled with the one or more antennas 1315 that are configured to support various receiving or obtaining operations, or one or more interfaces coupled with the one or more antennas 1315 that are configured to support various transmitting or outputting operations, or a combination thereof. In some implementations, the transceiver 1310 may include or be configured for coupling with one or more processors or one or more memory components that are operable to perform or support operations based on received or obtained information or signals, or to generate information or other signals for transmission or other outputting, or any combination thereof. In some implementations, the transceiver 1310, or the transceiver 1310 and the one or more antennas 1315, or the transceiver 1310 and the one or more antennas 1315 and one or more processors or one or more memory components (e.g., the at least one processor 1335, the at least one memory 1325, or both), may be included in a chip or chip assembly that is installed in the device 1305. In some examples, the transceiver 1310 may be operable to support communications via one or more communications links (e.g., a communication link 125, a backhaul communication link 120, a midhaul communication link 162, a fronthaul communication link 168).

The at least one memory 1325 may include RAM, ROM, or any combination thereof. The at least one memory 1325 may store computer-readable, computer-executable code 1330 including instructions that, when executed by one or more of the at least one processor 1335, cause the device 1305 to perform various functions described herein. The code 1330 may be stored in a non-transitory computer-readable medium such as system memory or another type of memory. In some cases, the code 1330 may not be directly executable by a processor of the at least one processor 1335 but may cause a computer (e.g., when compiled and executed) to perform functions described herein. In some cases, the at least one memory 1325 may contain, among other things, a BIOS which may control basic hardware or software operation such as the interaction with peripheral components or devices. In some examples, the at least one processor 1335 may include multiple processors and the at least one memory 1325 may include multiple memories. One or more of the multiple processors may be coupled with one or more of the multiple memories which may, individually or collectively, be configured to perform various functions herein (for example, as part of a processing system).

The at least one processor 1335 may include an intelligent hardware device (e.g., a general-purpose processor, a DSP, an ASIC, a CPU, an FPGA, a microcontroller, a programmable logic device, discrete gate or transistor logic, a discrete hardware component, or any combination thereof). In some cases, the at least one processor 1335 may be configured to operate a memory array using a memory controller. In some other cases, a memory controller may be integrated into one or more of the at least one processor 1335. The at least one processor 1335 may be configured to execute computer-readable instructions stored in a memory (e.g., one or more of the at least one memory 1325) to cause the device 1305 to perform various functions (e.g., functions or tasks supporting uplink reports and store and forward mode). For example, the device 1305 or a component of the device 1305 may include at least one processor 1335 and at least one memory 1325 coupled with one or more of the at least one processor 1335, the at least one processor 1335 and the at least one memory 1325 configured to perform various functions described herein. The at least one processor 1335 may be an example of a cloud-computing platform (e.g., one or more physical nodes and supporting software such as operating systems, virtual machines, or container instances) that may host the functions (e.g., by executing code 1330) to perform the functions of the device 1305. The at least one processor 1335 may be any one or more suitable processors capable of executing scripts or instructions of one or more software programs stored in the device 1305 (such as within one or more of the at least one memory 1325). In some examples, the at least one processor 1335 may include multiple processors and the at least one memory 1325 may include multiple memories. One or more of the multiple processors may be coupled with one or more of the multiple memories, which may, individually or collectively, be configured to perform various functions herein. In some examples, the at least one processor 1335 may be a component of a processing system, which may refer to a system (such as a series) of machines, circuitry (including, for example, one or both of processor circuitry (which may include the at least one processor 1335) and memory circuitry (which may include the at least one memory 1325)), or components, that receives or obtains inputs and processes the inputs to produce, generate, or obtain a set of outputs. The processing system may be configured to perform one or more of the functions described herein. For example, the at least one processor 1335 or a processing system including the at least one processor 1335 may be configured to, configurable to, or operable to cause the device 1305 to perform one or more of the functions described herein. Further, as described herein, being "configured to," being "configurable to," and being "operable to" may be used interchangeably and may be associated with a capability, when executing code stored in the at least one memory 1325 or otherwise, to perform one or more of the functions described herein.

In some examples, a bus 1340 may support communications of (e.g., within) a protocol layer of a protocol stack. In some examples, a bus 1340 may support communications associated with a logical channel of a protocol stack (e.g., between protocol layers of a protocol stack), which may include communications performed within a component of the device 1305, or between different components of the device 1305 that may be co-located or located in different locations (e.g., where the device 1305 may refer to a system in which one or more of the communications manager 1320, the transceiver 1310, the at least one memory 1325, the code 1330, and the at least one processor 1335 may be located in one of the different components or divided between different components).

In some examples, the communications manager 1320 may manage aspects of communications with a core network 130 (e.g., via one or more wired or wireless backhaul links). For example, the communications manager 1320 may manage the transfer of data communications for client devices, such as one or more UEs 115. In some examples, the communications manager 1320 may manage communications with other network entities 105, and may include a controller or scheduler for controlling communications with UEs 115 in cooperation with other network entities 105. In some examples, the communications manager 1320 may support an X2 interface within an LTE/LTE-A wireless communications network technology to provide communication between network entities 105.

For example, the communications manager 1320 is capable of, configured to, or operable to support a means for transmitting an indication that the NTN node is operating in a store and forward mode. The communications manager 1320 is capable of, configured to, or operable to support a means for obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN.

By including or configuring the communications manager 1320 in accordance with examples as described herein, the device 1305 may support techniques for improved communication reliability, reduced latency, reduced power consumption, more efficient utilization of communication resources, improved coordination between devices, longer battery life, improved utilization of processing capability.

In some examples, the communications manager 1320 may be configured to perform various operations (e.g., receiving, obtaining, monitoring, outputting, transmitting) using or otherwise in cooperation with the transceiver 1310, the one or more antennas 1315 (e.g., where applicable), or any combination thereof. Although the communications manager 1320 is illustrated as a separate component, in some examples, one or more functions described with reference to the communications manager 1320 may be supported by or performed by the transceiver 1310, one or more of the at least one processor 1335, one or more of the at least one memory 1325, the code 1330, or any combination thereof (for example, by a processing system including at least a portion of the at least one processor 1335, the at least one memory 1325, the code 1330, or any combination thereof). For example, the code 1330 may include instructions executable by one or more of the at least one processor 1335 to cause the device 1305 to perform various aspects of uplink reports and store and forward mode as described herein, or the at least one processor 1335 and the at least one memory 1325 may be otherwise configured to, individually or collectively, perform or support such operations.

Figure 14:
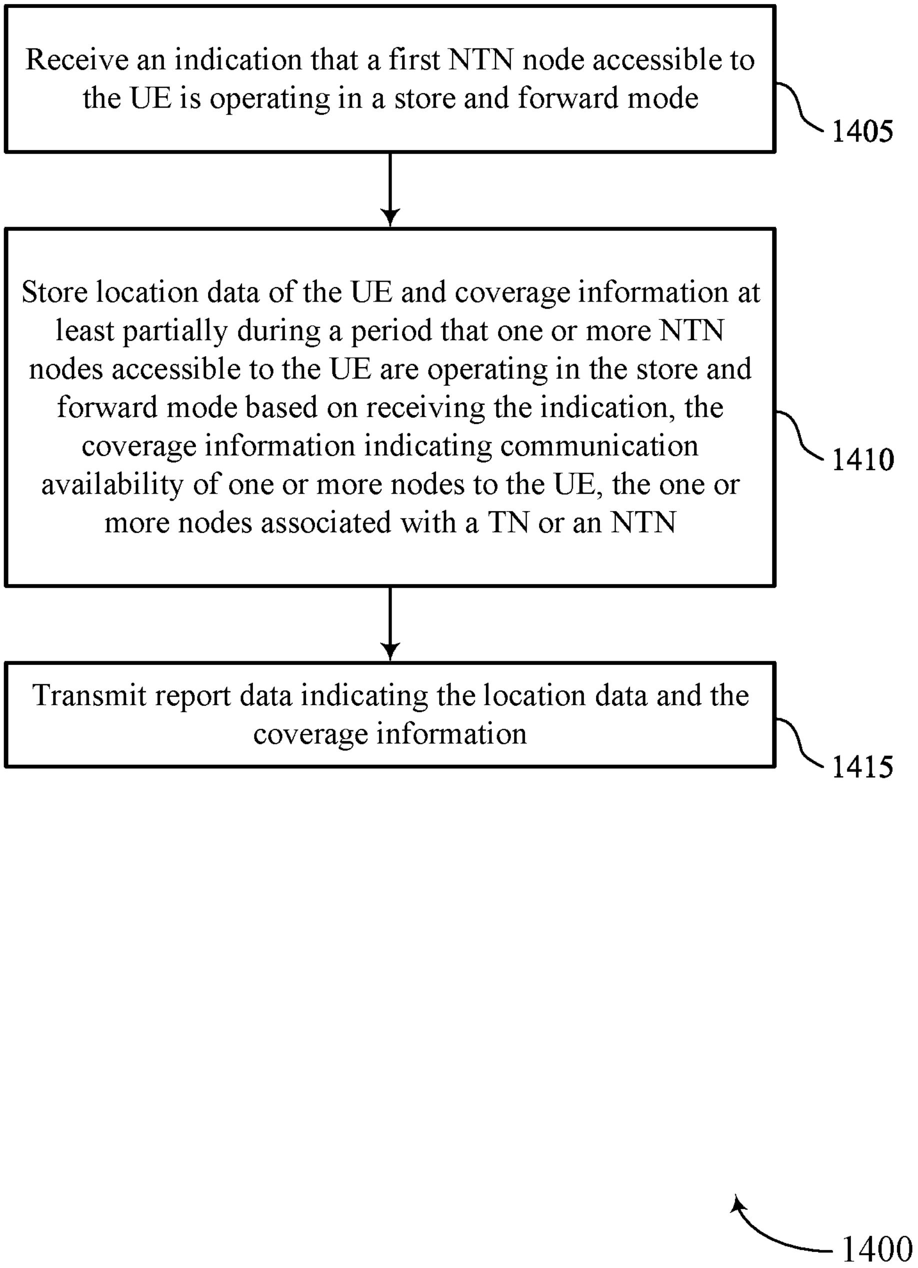
FIGS. 14 through 17 show flowcharts illustrating methods that support uplink reports and store and forward mode in accordance with one or more aspects of the present disclosure.

FIG. 14 shows a flowchart illustrating a method 1400 that supports uplink reports and store and forward mode in accordance with one or more aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1405, the method may include receiving an indication that a first NTN node accessible to the UE is operating in a store and forward mode. The operations of block 1405 may be performed in accordance with examples as disclosed herein. In some examples, aspects of the operations of 1405 may be performed by a store and forward component 825 as described with reference to FIG. 8.

At 1410, the method may include storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN. The operations of block 1410 may be performed in accordance with examples as disclosed herein. In some examples, aspects of the operations of 1410 may be performed by a location and coverage component 830 as described with reference to FIG. 8.

At 1415, the method may include transmitting report data indicating the location data and the coverage information. The operations of block 1415 may be performed in accordance with examples as disclosed herein. In some examples, aspects of the operations of 1415 may be performed by a report component 835 as described with reference to FIG. 8.

Figure 15:
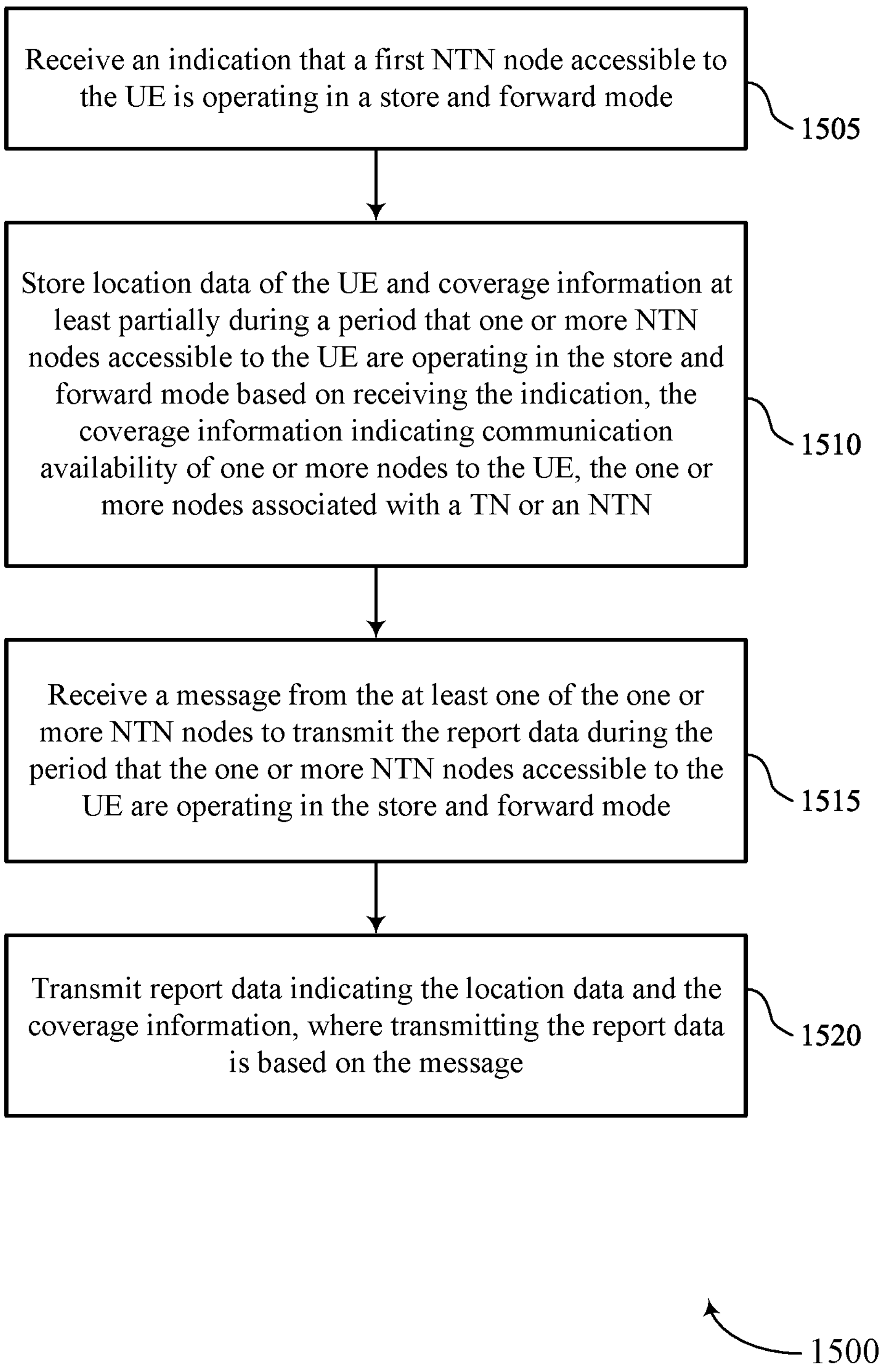

FIG. 15 shows a flowchart illustrating a method 1500 that supports uplink reports and store and forward mode in accordance with one or more aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally, or alternatively, the UE may perform aspects of the described functions using special-purpose hardware.

At 1505, the method may include receiving an indication that a first NTN node accessible to the UE is operating in a store and forward mode. The operations of block 1505 may be performed in accordance with examples as disclosed herein. In some examples, aspects of the operations of 1505 may be performed by a store and forward component 825 as described with reference to FIG. 8.

At 1510, the method may include storing location data of the UE and coverage information at least partially during a period that one or more NTN nodes accessible to the UE are operating in the store and forward mode based on receiving the indication, the coverage information indicating communication availability of one or more nodes to the UE, the one or more nodes associated with a TN or an NTN. The operations of block 1510 may be performed in accordance with examples as disclosed herein. In some examples, aspects of the operations of 1510 may be performed by a location and coverage component 830 as described with reference to FIG. 8.

At 1515, the method may include receiving a message from the at least one of the one or more NTN nodes to transmit the report data during the period that the one or more NTN nodes accessible to the UE are operating in the store and forward mode. The operations of block 1515 may be performed in accordance with examples as disclosed herein. In some examples, aspects of the operations of 1515 may be performed by a report message component 845 as described with reference to FIG. 8.

At 1520, the method may include transmitting report data indicating the location data and the coverage information, where transmitting the report data is based on the message. The operations of block 1520 may be performed in accordance with examples as disclosed herein. In some examples, aspects of the operations of 1520 may be performed by a report component 835 as described with reference to FIG. 8.

Figure 16:
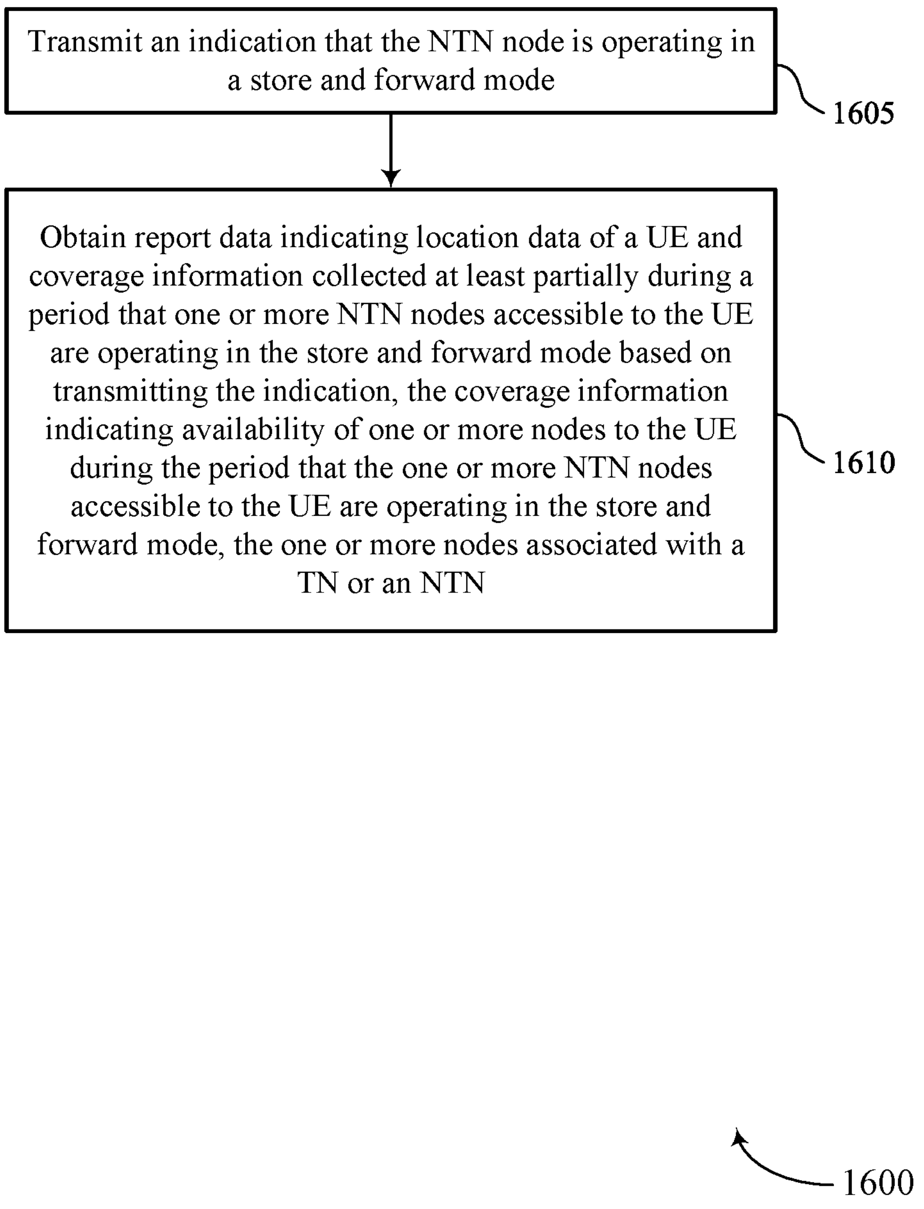

FIG. 16 shows a flowchart illustrating a method 1600 that supports uplink reports and store and forward mode in accordance with one or more aspects of the present disclosure. The operations of the method 1600 may be implemented by a NTN node or its components as described herein. For example, the operations of the method 1600 may be performed by a NTN node as described with reference to FIGS. 1 through 5 and 10 through 13. In some examples, a NTN node may execute a set of instructions to control the functional elements of the NTN node to perform the described functions. Additionally, or alternatively, the NTN node may perform aspects of the described functions using special-purpose hardware.

At 1605, the method may include transmitting an indication that the NTN node is operating in a store and forward mode. The operations of block 1605 may be performed in accordance with examples as disclosed herein. In some examples, aspects of the operations of 1605 may be performed by a store and forward manager 1225 as described with reference to FIG. 12.

At 1610, the method may include obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN. The operations of block 1610 may be performed in accordance with examples as disclosed herein. In some examples, aspects of the operations of 1610 may be performed by a location and coverage manager 1230 as described with reference to FIG. 12.

Figure 17:
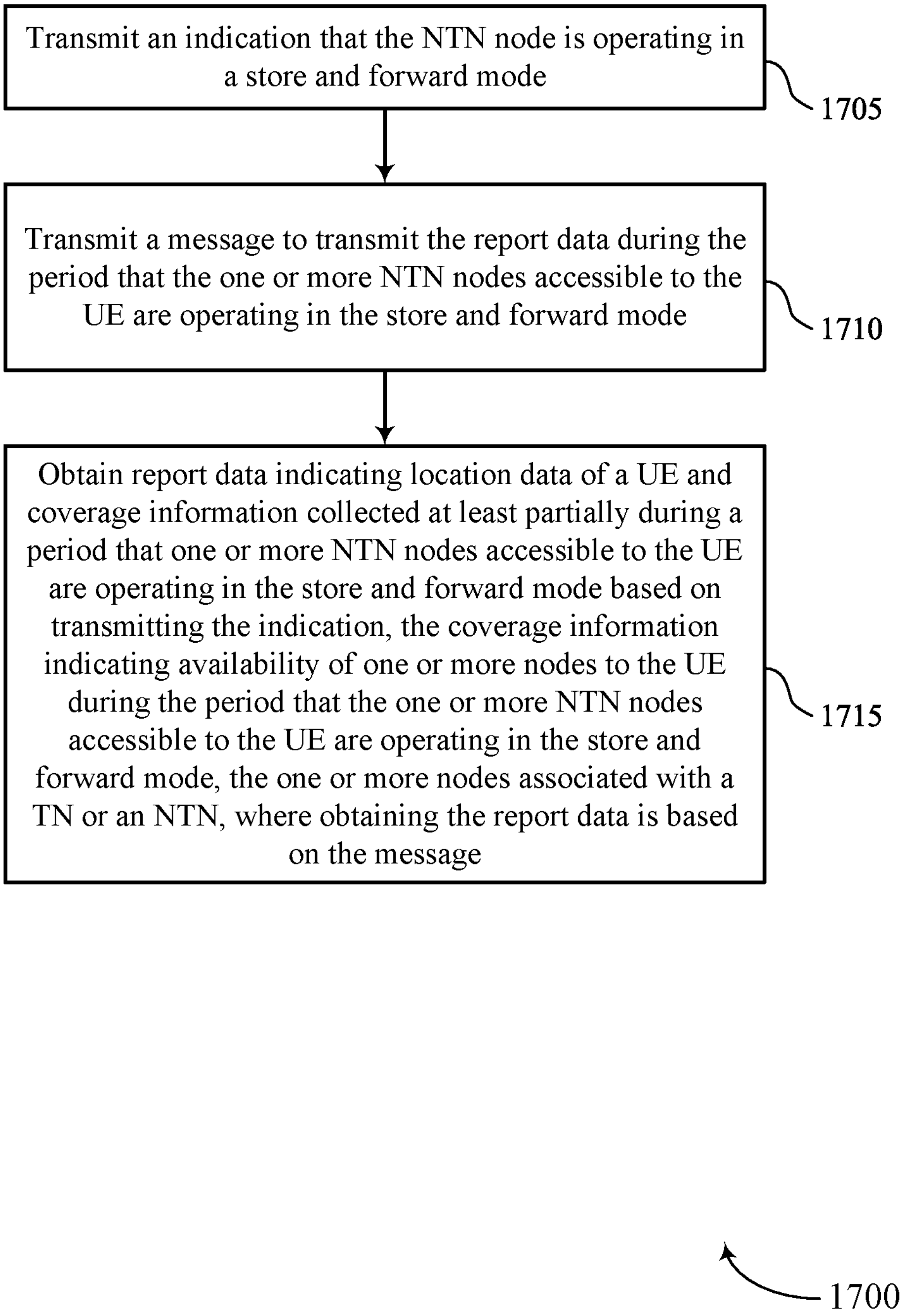

FIG. 17 shows a flowchart illustrating a method 1700 that supports uplink reports and store and forward mode in accordance with one or more aspects of the present disclosure. The operations of the method 1700 may be implemented by a NTN or its components as described herein. For example, the operations of the method 1700 may be performed by a NTN node as described with reference to FIGS. 1 through 5 and 10 through 13. In some examples, a NTN node may execute a set of instructions to control the functional elements of the NTN node to perform the described functions. Additionally, or alternatively, the NTN node may perform aspects of the described functions using special-purpose hardware.

At 1705, the method may include transmitting an indication that the NTN node is operating in a store and forward mode. The operations of block 1705 may be performed in accordance with examples as disclosed herein. In some examples, aspects of the operations of 1705 may be performed by a store and forward manager 1225 as described with reference to FIG. 12.

At 1710, the method may include transmitting a message to transmit the report data during the period that the one or more NTN nodes accessible to the UE are operating in the store and forward mode. The operations of block 1710 may be performed in accordance with examples as disclosed herein. In some examples, aspects of the operations of 1710 may be performed by a report message manager 1245 as described with reference to FIG. 12.

At 1715, the method may include obtaining report data indicating location data of a UE and coverage information collected at least partially during a period that one or more NTN nodes accessible to the UE are operating in the store and forward mode based on transmitting the indication, the coverage information indicating availability of one or more nodes to the UE during the period that the one or more NTN nodes accessible to the UE are operating in the store and forward mode, the one or more nodes associated with a TN or an NTN, where obtaining the report data is based on the message. The operations of block 1715 may be performed in accordance with examples as disclosed herein. In some examples, aspects of the operations of 1715 may be performed by a location and coverage manager 1230 as described with reference to FIG. 12.

The following provides an overview of aspects of the present disclosure:

Aspect 1: A method for wireless communications by a UE, comprising: receiving an indication that a first NTN node accessible to the UE is operating in a store and forward mode; storing location data of the UE and coverage information at least partially during a period that one or more NTN nodes accessible to the UE are operating in the store and forward mode based at least in part on receiving the indication, the coverage information indicating communication availability of one or more nodes to the UE, the one or more nodes associated with a TN or an NTN; and transmitting report data indicating the location data and the coverage information.

Aspect 2: The method of aspect 1, wherein the report data is transmitted to at least one of the one or more NTN nodes during the period that the one or more NTN nodes accessible to the UE are operating in the store and forward mode.

Aspect 3: The method of aspect 2, further comprising: receiving an indication of a rejection of management for the report data transmitted to the at least one of the one or more NTN nodes during the period; and transmitting, based at least in part on the indication of the rejection, the report data to a TN node or to an NTN node not operating in the store and forward mode.

Aspect 4: The method of aspect 2, further comprising: receiving a message from the at least one of the one or more NTN nodes to transmit the report data during the period that the one or more NTN nodes accessible to the UE are operating in the store and forward mode, wherein transmitting the report data is based at least in part on the message.

Aspect 5: The method of any of aspects 1 through 4, wherein transmitting the report data comprises: transmitting the report data to a TN node.

Aspect 6: The method of any of aspects 1 through 5, further comprising: receiving a request for the location data and the coverage information, the request being included in a UE information request message or a logged measurement configuration message, wherein the location data and the coverage information are stored at least partially during the period that the one or more NTN nodes accessible to the UE are operating in the store and forward mode based at least in part on receiving the request.

Aspect 7: The method of any of aspects 1 through 6, wherein the coverage information comprises WWAN coverage status information, PLMN availability information, RAT availability information, or any combination thereof.

Aspect 8: The method of any of aspects 1 through 7, wherein the coverage information comprises a first parameter indicating availability of a TN cell, availability of an NTN cell, availability of an NTN cell operating in the store and forward mode, no coverage, or any combination thereof, and a second parameter indicating availability of a PLMN, availability of a RAT, a duration of availability, or any combination thereof.

Aspect 9: The method of any of aspects 1 through 8, wherein the report data is included in an RRC message, UAI, a MDT report, a message at a layer higher than a physical layer, a NAS message, a user plane message, or any combination thereof.

Aspect 10: A method for wireless communications by a NTN node, comprising: transmitting an indication that the NTN node is operating in a store and forward mode; and obtaining report data indicating location data of a UE and coverage information collected at least partially during a period that one or more NTN nodes accessible to the UE are operating in the store and forward mode based at least in part on transmitting the indication, the coverage information indicating availability of one or more nodes to the UE during the period that the one or more NTN nodes accessible to the UE are operating in the store and forward mode, the one or more nodes associated with a TN or an NTN.

Aspect 11: The method of aspect 10, wherein the report data is obtained in the period that that the one or more NTN nodes accessible to the UE are operating in the store and forward mode.

Aspect 12: The method of aspect 11, further comprising: transmitting an indication of rejection of management for the report data obtained in the period.

Aspect 13: The method of aspect 11, further comprising: transmitting the report data to a core network when a feeder link between the NTN node and the core network is available.

Aspect 14: The method of any of aspects 11 through 13, further comprising: transmitting a message to transmit the report data during the period that the one or more NTN nodes accessible to the UE are operating in the store and forward mode, wherein obtaining the report data is based at least in part on the message.

Aspect 15: The method of any of aspects 10 through 14, further comprising: transmitting a request for the location data and the coverage information, the request being included in a UE information request message or a logged measurement configuration message, wherein the location data and the coverage information are obtained at least partially during the period that the NTN node is operating in the store and forward mode based at least in part on transmitting the request.

Aspect 16: The method of any of aspects 10 through 15, wherein the coverage information comprises WWAN coverage status information, PLMN availability information, RAT availability information, or any combination thereof.

Aspect 17: The method of any of aspects 10 through 16, wherein the coverage information comprises a first parameter indicating availability of a TN cell, availability of an NTN cell, availability of an NTN cell operating in the store and forward mode, no coverage, or any combination thereof, and a second parameter indicating availability of a PLMN, availability of a RAT, a duration of availability, or any combination thereof.

Aspect 18: The method of any of aspects 10 through 17, wherein the report data is included in an RRC message, UAI, a MDT report, a message at a layer higher than a physical layer, a NAS message, a user plane message, or any combination thereof.

Aspect 19: A UE comprising one or more memories storing processor-executable code, and one or more processors coupled with the one or more memories and individually or collectively operable to execute the code to cause the UE to perform a method of any of aspects 1 through 9.

Aspect 20: A UE comprising at least one means for performing a method of any of aspects 1 through 9.

Aspect 21: A non-transitory computer-readable medium storing code the code comprising instructions executable by one or more processors to perform a method of any of aspects 1 through 9.

Aspect 22: A NTN node comprising one or more memories storing processor-executable code, and one or more processors coupled with the one or more memories and individually or collectively operable to execute the code to cause the NTN node to perform a method of any of aspects 10 through 18.

Aspect 23: A NTN node comprising at least one means for performing a method of any of aspects 10 through 18.

Aspect 24: A non-transitory computer-readable medium storing code the code comprising instructions executable by one or more processors to perform a method of any of aspects 10 through 18.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed using a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor but, in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Any functions or operations described herein as being capable of being performed by a processor may be performed by multiple processors that, individually or collectively, are capable of performing the described functions or operations.

The functions described herein may be implemented using hardware, software executed by a processor, firmware, or any combination thereof. If implemented using software executed by a processor, the functions may be stored as or transmitted using one or more instructions or code of a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one location to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc. Disks may reproduce data magnetically, and discs may reproduce data optically using lasers. Combinations of the above are also included within the scope of computer-readable media. Any functions or operations described herein as being capable of being performed by a memory may be performed by multiple memories that, individually or collectively, are capable of performing the described functions or operations.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

As used herein, including in the claims, the article "a" before a noun is open-ended and understood to refer to "at least one" of those nouns or "one or more" of those nouns. Thus, the terms "a," "at least one," "one or more," "at least one of one or more" may be interchangeable. For example, if a claim recites "a component" that performs one or more functions, each of the individual functions may be performed by a single component or by any combination of multiple components. Thus, the term "a component" having characteristics or performing functions may refer to "at least one of one or more components" having a particular characteristic or performing a particular function. Subsequent reference to a component introduced with the article "a" using the terms "the" or "said" may refer to any or all of the one or more components. For example, a component introduced with the article "a" may be understood to mean "one or more components," and referring to "the component" subsequently in the claims may be understood to be equivalent to referring to "at least one of the one or more components." Similarly, subsequent reference to a component introduced as "one or more components" using the terms "the" or "said" may refer to any or all of the one or more components. For example, referring to "the one or more components" subsequently in the claims may be understood to be equivalent to referring to "at least one of the one or more components."

The term "determine" or "determining" encompasses a variety of actions and, therefore, "determining" can include calculating, computing, processing, deriving, investigating, looking up (such as via looking up in a table, a database or another data structure), ascertaining and the like. Also, "determining" can include receiving (e.g., receiving information), accessing (e.g., accessing data stored in memory) and the like. Also, "determining" can include resolving, obtaining, selecting, choosing, establishing, and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A user equipment (UE), comprising:

one or more memories storing processor-executable code; and one or more processors coupled with the one or more memories and individually or collectively operable to execute the code to cause the UE to:

receive an indication that a first non-terrestrial network (NTN) node accessible to the UE is operating in a store and forward mode;

store location data of the UE and coverage information during a period that one or more NTN nodes accessible to the UE are operating in the store and forward mode based at least in part on receiving the indication, the coverage information indicating communication availability of one or more nodes to the UE, the one or more nodes associated with a terrestrial network (TN) or an NTN; and transmit report data indicating the location data and the coverage information.

2. The UE of claim 1, wherein the report data is transmitted to at least one of the one or more NTN nodes during the period that the one or more NTN nodes accessible to the UE are operating in the store and forward mode.

3. The UE of claim 2, wherein the one or more processors are individually or collectively further operable to execute the code to cause the UE to:

receive an indication of a rejection of management for the report data transmitted to the at least one of the one or more NTN nodes during the period; and transmit, based at least in part on the indication of the rejection, the report data to a TN node or to an NTN node not operating in the store and forward mode.

4. The UE of claim 2, wherein the one or more processors are individually or collectively further operable to execute the code to cause the UE to:

receive a message from the at least one of the one or more NTN nodes to transmit the report data during the period that the one or more NTN nodes accessible to the UE are operating in the store and forward mode, wherein transmitting the report data is based at least in part on the message.

5. The UE of claim 1, wherein, to transmit the report data, the one or more processors are individually or collectively operable to execute the code to cause the UE to:

transmit the report data to a TN node.

6. The UE of claim 1, wherein the one or more processors are individually or collectively further operable to execute the code to cause the UE to:

receive a request for the location data and the coverage information, the request being included in a UE information request message or a logged measurement configuration message, wherein the location data and the coverage information are stored during the period that the one or more NTN nodes accessible to the UE are operating in the store and forward mode based at least in part on receiving the request.

7. The UE of claim 1, wherein the coverage information comprises wireless wide area network (WWAN) coverage status information, public land mobile network (PLMN) availability information, radio access technology (RAT) availability information, or any combination thereof.

8. The UE of claim 1, wherein the coverage information comprises a first parameter indicating availability of a TN cell, availability of an NTN cell, availability of an NTN cell operating in the store and forward mode, no coverage, or any combination thereof, and a second parameter indicating availability of a public land mobile network (PLMN), availability of a radio access technology (RAT), a duration of availability, or any combination thereof.

9. The UE of claim 1, wherein the report data is included in a radio resource control (RRC) message, UE assistance information (UAI), a minimization of drive test (MDT) report, a message at a layer higher than a physical layer, a non-access stratum (NAS) message, a user plane message, or any combination thereof.

10. A non-terrestrial network (NTN) node, comprising:

one or more memories storing processor-executable code; and one or more processors coupled with the one or more memories and individually or collectively operable to execute the code to cause the NTN node to:

transmit an indication that the NTN node is operating in a store and forward mode; and obtain report data indicating location data of a user equipment (UE) and coverage information collected during a period that one or more NTN nodes accessible to the UE are operating in the store and forward mode based at least in part on transmitting the indication, the coverage information indicating availability of one or more nodes to the UE during the period that the one or more NTN nodes accessible to the UE are operating in the store and forward mode, the one or more nodes associated with a terrestrial network (TN) or an NTN.

11. The NTN node of claim 10, wherein the report data is obtained in the period that that the one or more NTN nodes accessible to the UE are operating in the store and forward mode.

12. The NTN node of claim 11, wherein the one or more processors are individually or collectively further operable to execute the code to cause the NTN node to:

transmit an indication of rejection of management for the report data obtained in the period.

13. The NTN node of claim 11, wherein the one or more processors are individually or collectively further operable to execute the code to cause the NTN node to:

transmit the report data to a core network when a feeder link between the NTN node and the core network is available.

14. The NTN node of claim 11, wherein the one or more processors are individually or collectively further operable to execute the code to cause the NTN node to:

transmit a message to transmit the report data during the period that the one or more NTN nodes accessible to the UE are operating in the store and forward mode, wherein obtaining the report data is based at least in part on the message.

15. The NTN node of claim 10, wherein the one or more processors are individually or collectively further operable to execute the code to cause the NTN node to:

transmit a request for the location data and the coverage information, the request being included in a UE information request message or a logged measurement configuration message, wherein the location data and the coverage information are obtained during the period that the NTN node is operating in the store and forward mode based at least in part on transmitting the request.

16. The NTN node of claim 10, wherein the coverage information comprises wireless wide area network (WWAN) coverage status information, public land mobile network (PLMN) availability information, radio access technology (RAT) availability information, or any combination thereof.

17. The NTN node of claim 10, wherein the coverage information comprises a first parameter indicating availability of a TN cell, availability of an NTN cell, availability of an NTN cell operating in the store and forward mode, no coverage, or any combination thereof, and a second parameter indicating availability of a public land mobile network (PLMN), availability of a radio access technology (RAT), a duration of availability, or any combination thereof.

18. The NTN node of claim 10, wherein the report data is included in a radio resource control (RRC) message, UE assistance information (UAI), a minimization of drive test (MDT) report, a message at a layer higher than a physical layer, a non-access stratum (NAS) message, a user plane message, or any combination thereof.

19. A method for wireless communications by a user equipment (UE), comprising:

receiving an indication that a first non-terrestrial network (NTN) node accessible to the UE is operating in a store and forward mode;

storing location data of the UE and coverage information during a period that one or more NTN nodes accessible to the UE are operating in the store and forward mode based at least in part on receiving the indication, the coverage information indicating communication availability of one or more nodes to the UE, the one or more nodes associated with a terrestrial network (TN) or an NTN; and transmitting report data indicating the location data and the coverage information.

20. The method of claim 19, wherein the report data is transmitted to at least one of the one or more NTN nodes during the period that the one or more NTN nodes accessible to the UE are operating in the store and forward mode.

21. The method of claim 20, further comprising:

receiving an indication of a rejection of management for the report data transmitted to the at least one of the one or more NTN nodes during the period; and transmitting, based at least in part on the indication of the rejection, the report data to a TN node or to an NTN node not operating in the store and forward mode.

22. The method of claim 20, further comprising:

receiving a message from the at least one of the one or more NTN nodes to transmit the report data during the period that the one or more NTN nodes accessible to the UE are operating in the store and forward mode, wherein transmitting the report data is based at least in part on the message.

23. The method of claim 19, wherein transmitting the report data comprises:

transmitting the report data to a terrestrial network node.

24. The method of claim 19, further comprising:

receiving a request for the location data and the coverage information, the request being included in a UE information request message or a logged measurement configuration message, wherein the location data and the coverage information are stored during the period that the one or more NTN nodes accessible to the UE are operating in the store and forward mode based at least in part on receiving the request.

25. A method for wireless communications by a non-terrestrial network (NTN) node, comprising:

transmitting an indication that the NTN node is operating in a store and forward mode; and obtaining report data indicating location data of a user equipment (UE) and coverage information collected during a period that one or more NTN nodes accessible to the UE are operating in the store and forward mode based at least in part on transmitting the indication, the coverage information indicating availability of one or more nodes to the UE during the period that the one or more NTN nodes accessible to the UE are operating in the store and forward mode, the one or more nodes associated with a terrestrial network (TN) or an NTN.

26. The method of claim 25, wherein the report data is obtained in the period that that the one or more NTN nodes accessible to the UE are operating in the store and forward mode.

27. The method of claim 26, further comprising:

transmitting an indication of rejection of management for the report data obtained in the period.

28. The method of claim 26, further comprising:

transmitting the report data to a core network when a feeder link between the NTN node and the core network is available.

29. The method of claim 26, further comprising:

transmitting a message to transmit the report data during the period that the one or more NTN nodes accessible to the UE are operating in the store and forward mode, wherein obtaining the report data is based at least in part on the message.

30. The method of claim 25, further comprising:

transmitting a request for the location data and the coverage information, the request being included in a UE information request message or a logged measurement configuration message, wherein the location data and the coverage information are obtained during the period that the NTN node is operating in the store and forward mode based at least in part on transmitting the request.

* * * * *